(12) United States Patent
VanDenberg et al.

(10) Patent No.: US 8,256,782 B2
(45) Date of Patent: Sep. 4, 2012

(54) SUSPENSION ASSEMBLY

(75) Inventors: Ervin K. VanDenberg, Massillon, OH (US); David H. Croston, Navarre, OH (US)

(73) Assignee: Air Suspensions, Inc., Massillon, OH (US)

( * ) Notice: Subject to any disclaimer, the term of this patent is extended or adjusted under 35 U.S.C. 154(b) by 209 days.

(21) Appl. No.: 12/768,069

(22) Filed: Apr. 27, 2010

(65) Prior Publication Data
US 2010/0207346 A1 Aug. 19, 2010

Related U.S. Application Data

(63) Continuation-in-part of application No. 12/117,366, filed on May 8, 2008, now Pat. No. 7,726,674.

(51) Int. Cl.
*B60G 11/18* (2006.01)

(52) U.S. Cl. ... 280/124.128; 280/124.153; 280/124.175; 267/189

(58) Field of Classification Search .............. 280/86.5, 280/124.116, 124.118, 124.157, 124.162, 280/124.164–124.166, 124.177, 124.126, 280/124.153, 124.175; 267/64.19, 64.23, 267/64.26, 189, 256–258
See application file for complete search history.

(56) References Cited

U.S. PATENT DOCUMENTS

| | | | |
|---|---|---|---|
| 2,998,981 A | 9/1961 | Derr | |
| 3,140,880 A * | 7/1964 | Masser | 280/124.108 |
| 3,246,716 A | 4/1966 | Kozicki | |
| 3,784,221 A | 1/1974 | Frasier, Sr. | |
| 3,961,826 A | 6/1976 | Sweet et al. | |
| 4,171,830 A | 10/1979 | Metz | |
| 4,614,247 A | 9/1986 | Sullivan | |
| 4,966,386 A | 10/1990 | Werdich | |
| 5,161,814 A | 11/1992 | Walker | |
| 5,163,701 A | 11/1992 | Cromley, Jr. | |
| 5,215,328 A | 6/1993 | Bono et al. | |
| 5,215,331 A | 6/1993 | Pittman | |
| 5,277,450 A | 1/1994 | Henschen | |
| 5,366,237 A | 11/1994 | Dilling et al. | |
| 5,427,404 A | 6/1995 | Stephens | |
| 5,505,481 A | 4/1996 | VanDenberg et al. | |
| 5,505,482 A | 4/1996 | VanDenberg et al. | |
| 5,540,454 A | 7/1996 | VanDenberg et al. | |
| 5,683,098 A | 11/1997 | VanDenberg et al. | |
| 5,690,353 A | 11/1997 | Vandenberg | |
| 5,718,445 A | 2/1998 | VanDenberg | |
| 5,788,263 A | 8/1998 | VanDenberg | |
| 5,820,156 A | 10/1998 | VanDenberg | |
| 5,853,183 A | 12/1998 | VanDenberg | |
| 5,924,712 A | 7/1999 | Pierce | |
| 5,951,032 A * | 9/1999 | Overby et al. | 280/124.116 |
| 6,328,322 B1 | 12/2001 | Pierce | |
| 6,340,165 B1 | 1/2002 | Kelderman | |

(Continued)

*Primary Examiner* — Joseph Rocca
*Assistant Examiner* — James English
(74) *Attorney, Agent, or Firm* — Sand & Sebolt

(57) ABSTRACT

A vehicle suspension system includes a frame mounting bracket. A torsion axle is pivotally attached to the frame mounting bracket. The torsion axle pivots about a suspension assembly pivot axis. An air spring support arm is rigidly attached to the torsion axle. An air spring is attached at one end to the frame mounting bracket and at an end of the support arm opposite the suspension assembly pivot axis. A spindle arm with a spindle is adapted for mounting a wheel assembly is attached to the torsion axle. The vehicle suspension system is adapted to include an optional cross-member brace adapted to attach to the frame mounting bracket allowing the cross-member brace to extend across a width of a vehicle to an adjacent vehicle suspension assembly.

21 Claims, 25 Drawing Sheets

U.S. PATENT DOCUMENTS

| | | |
|---|---|---|
| 6,594,980 B2 * | 7/2003 | Oka et al. .................. 56/15.8 |
| 6,752,411 B2 | 6/2004 | Few |
| 6,945,548 B2 * | 9/2005 | Dudding et al. ....... 280/124.157 |
| 7,137,487 B2 * | 11/2006 | Powers ..................... 188/18 A |
| 7,416,200 B2 | 8/2008 | Hass et al. |
| 7,516,821 B2 | 4/2009 | Powers |
| 2002/0149164 A1 | 10/2002 | Pierce et al. |
| 2003/0098564 A1 | 5/2003 | VanDenberg et al. |
| 2004/0188973 A1 | 9/2004 | Molitor |
| 2010/0270766 A1 * | 10/2010 | Vandenberg et al. .. 280/124.116 |
| 2011/0095503 A1 * | 4/2011 | Dodd et al. ............ 280/124.135 |

* cited by examiner

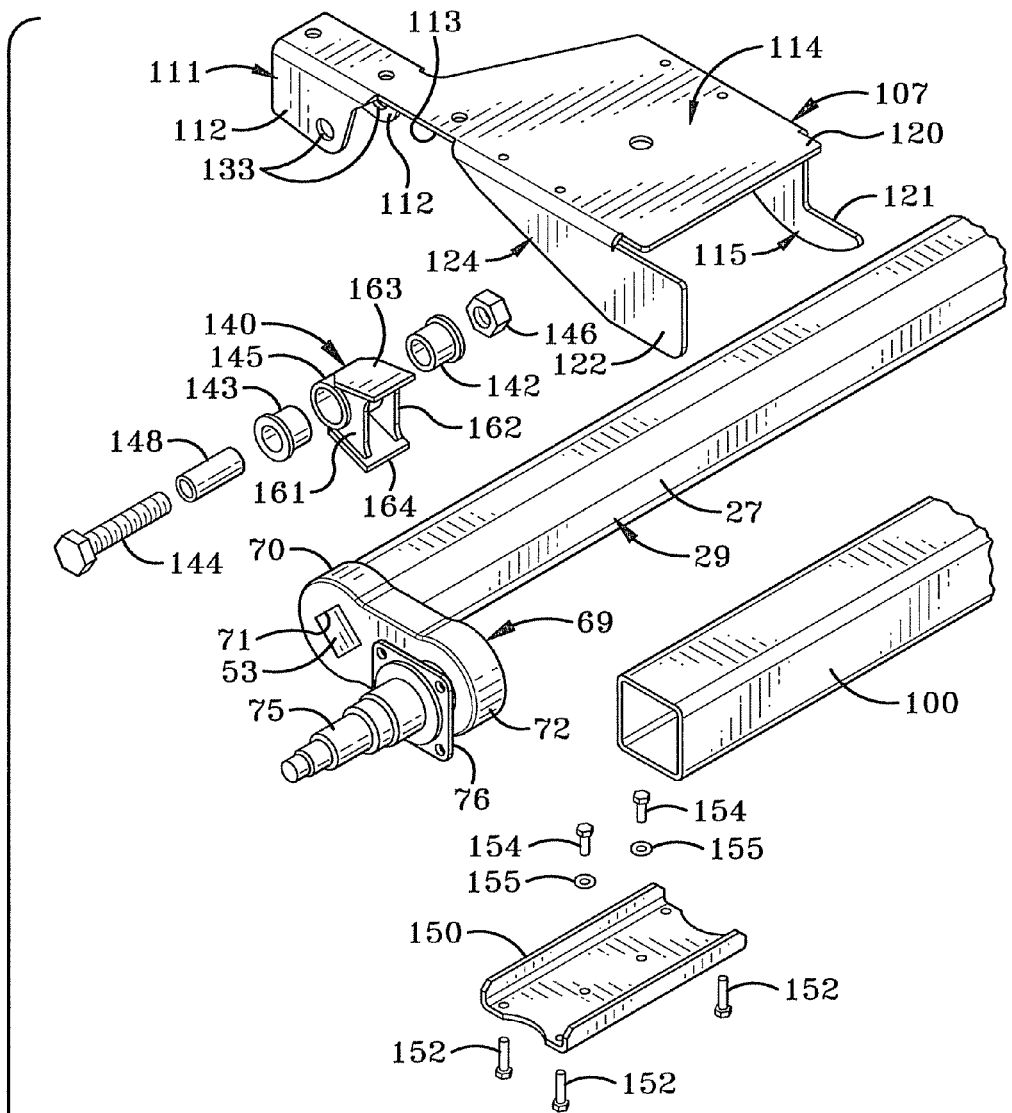
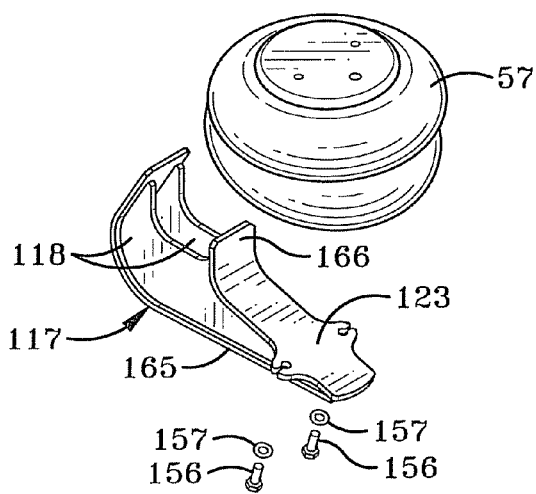
FIG-21

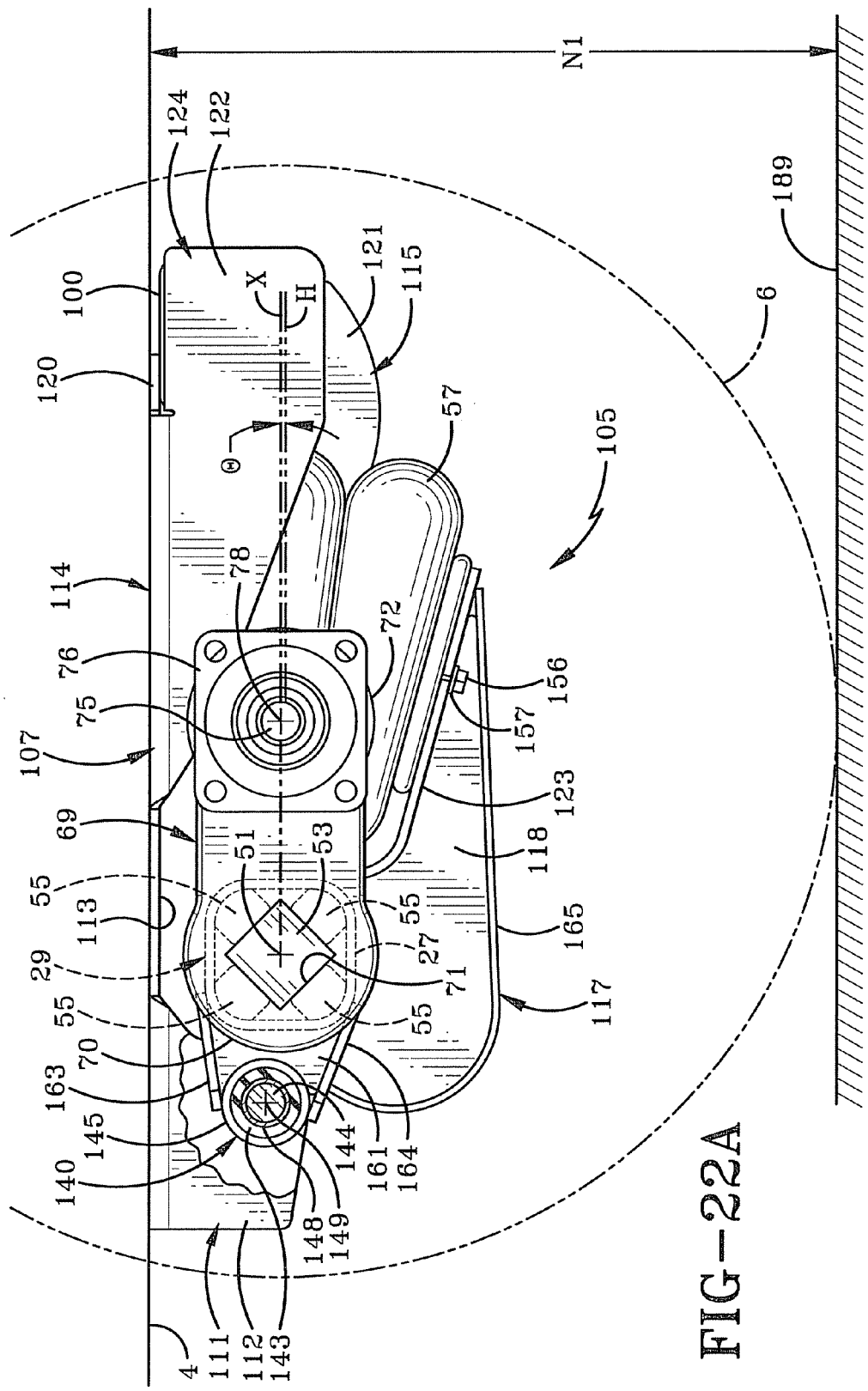

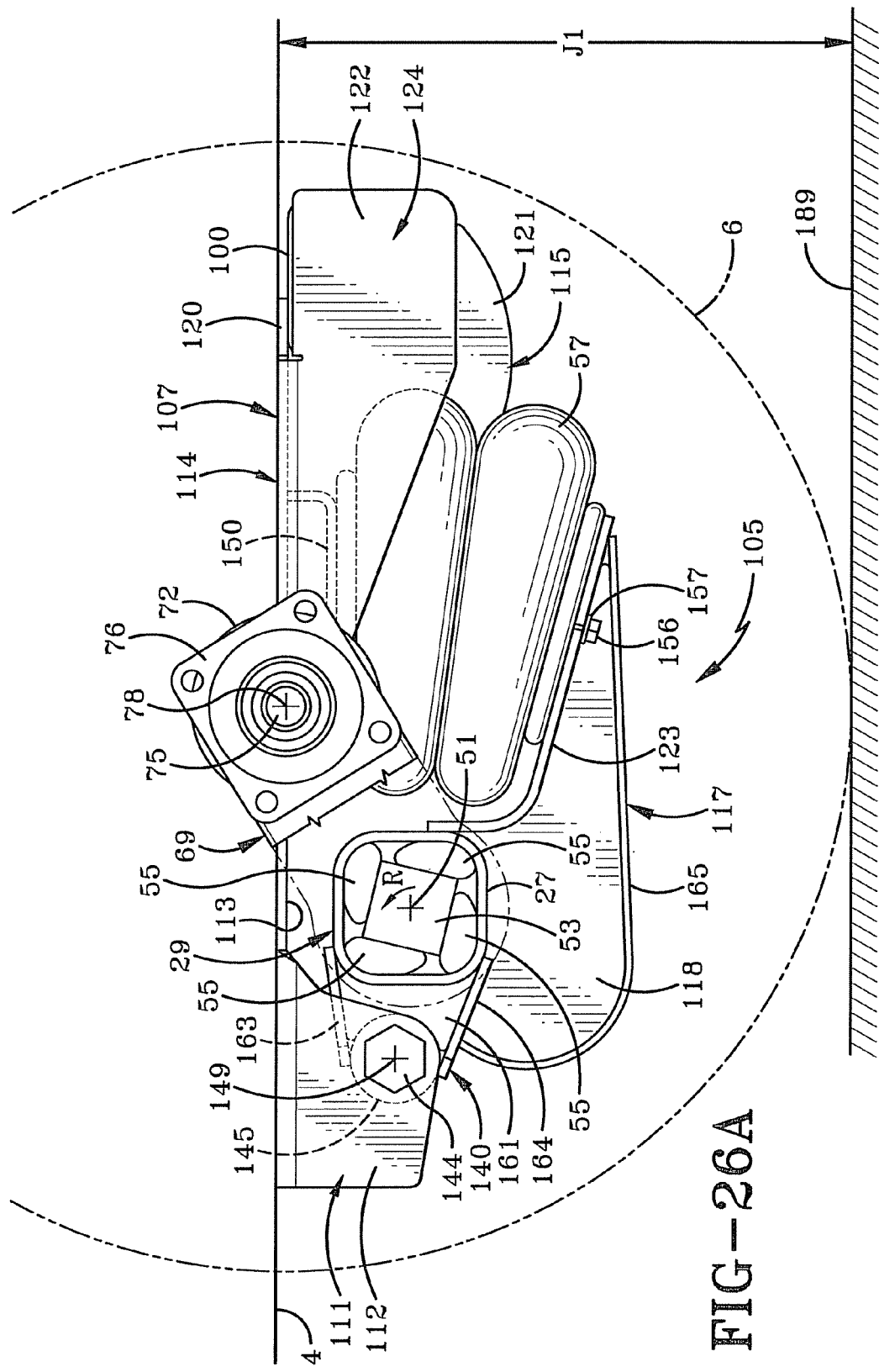

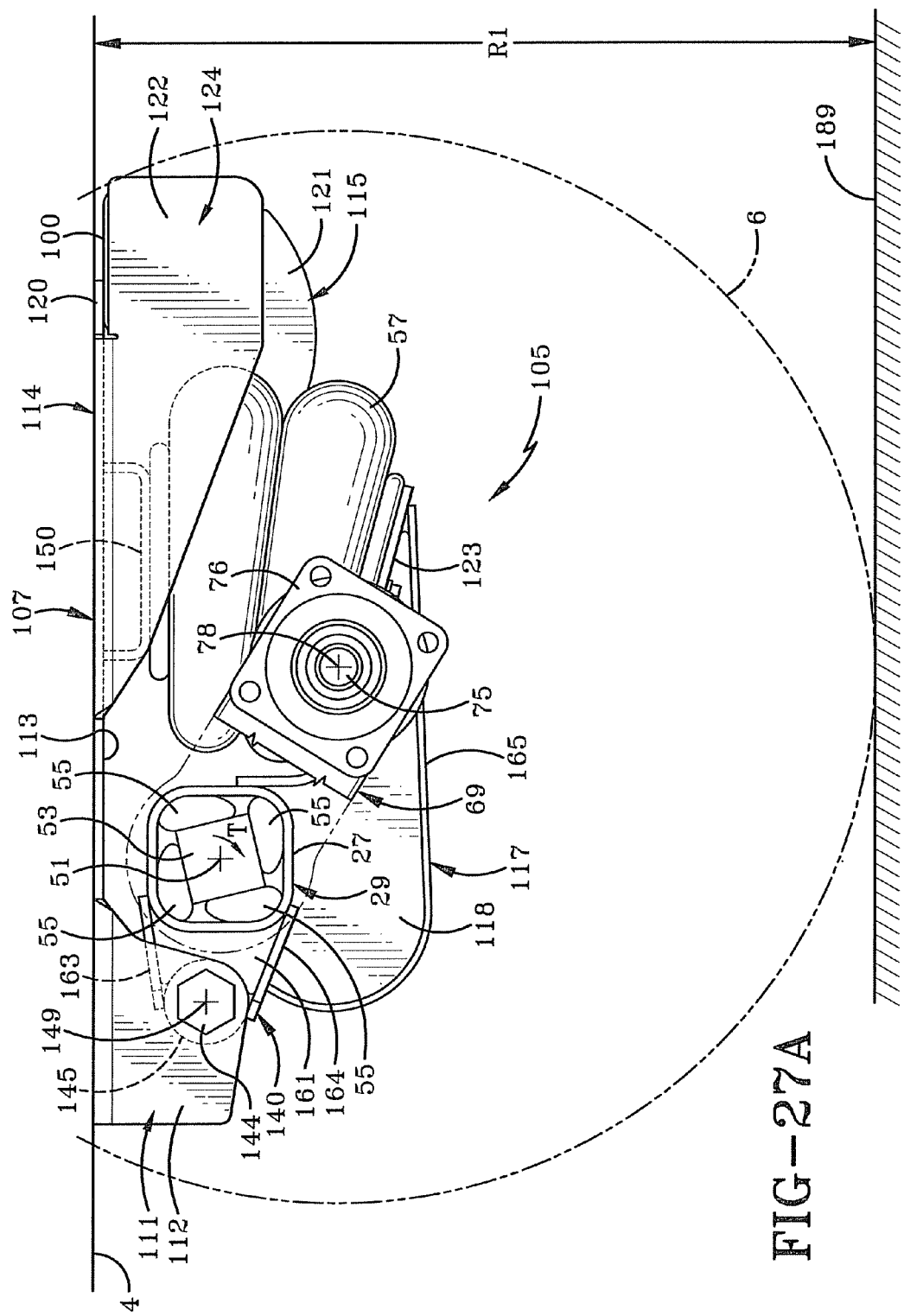

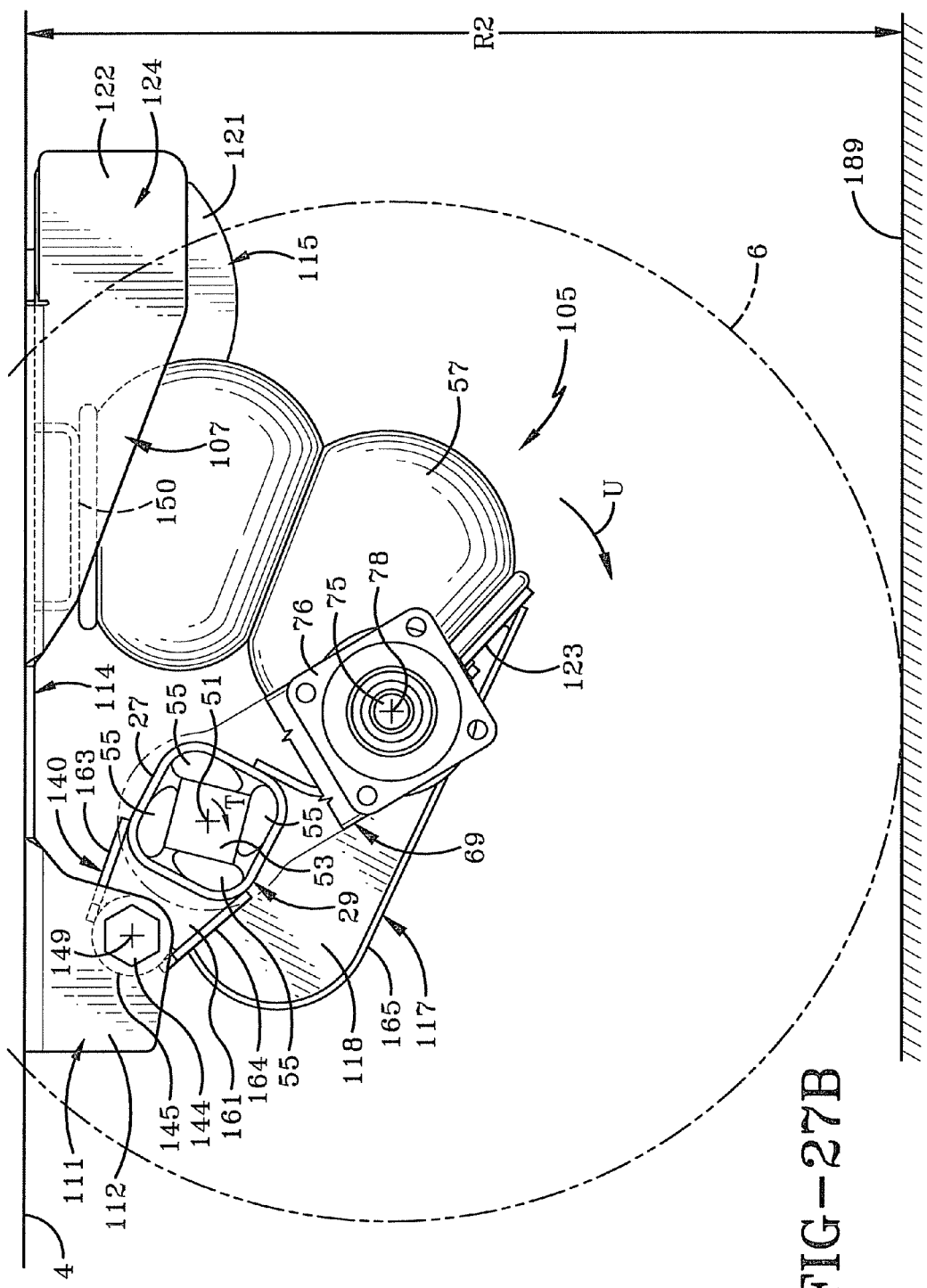

SUSPENSION ASSEMBLY

CLAIM FOR PRIORITY

This application is a continuation-in-part of U.S. patent application Ser. No. 12/117,366 filed May 8, 2008; the disclosure of which is incorporated herein by reference.

BACKGROUND OF THE INVENTION

1. Technical Field

The invention relates to suspension systems for vehicles, such as trailers and trucks. More particularly, the invention relates to a suspension assembly having a torsion axle in combination with an air spring. Even more particularly, the invention relates to a more compact, lighter weight combination torsion axle—air spring suspension assembly than known prior art combination suspension assemblies.

2. Background Information

Torsion axles have been known for many years, such as shown in U.S. Pat. No. 2,998,981. Torsion axles have proven to be extremely popular because if one wheel hits a bump or rut, it can react independently of the other wheel, which may not hit a bump or rut at the same time. This torsion axle concept operates to keep a trailer moving as straight as possible behind a towing vehicle and absorbs some of the shock of the road over which it is passing with an independent suspension. This is contrasted with a straight axle where if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Most torsion axles are constructed of a square axle in cross section with elongated rubber members disposed in-between the square axle and a larger outer tube. U.S. Pat. Nos. 5,161,814 and 5,820,156 disclose such a construction. One common torsion axle is a TorFlex® rubber torsion suspension system distributed by Dexter Axle. This type of torsion axle has independent and separate stub axles or stub shafts on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after such bending. It is also known to use air bags, commonly referred to as air springs, for straight, non-torsion axles, such as shown in U.S. Pat. Nos. 3,784,221 and 5,427,404. While it is true that both the torsion axle technology and the air spring technology has been quite successful independently in making a smoother ride and enhanced the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring.

The suspension assembly of the present invention improves on the system of U.S. Pat. No. 6,340,165 by providing a more rugged, compact, lighter weight structure by shortening the distance from the pivot axis of the air spring support arm to the axis of the torsion axle and to the centerline of the air spring. This results in lower torque on the axle tube in roll or diagonal walk or tramp.

This lower beam stress enables lighter, less expensive beams and axle connections to be utilized. It provides less vertical axle tube motion and enables lower design heights to be achieved. The air spring of the present invention nests behind the axle tube and generally inboard of the swing arm, and provides better ground clearance particularly in rebound.

BRIEF SUMMARY OF THE INVENTION

The present invention relates to a vehicle suspension assembly for attachment to a vehicle frame having a torsion axle and at least two ground engaging wheels operatively rotatably attached to each respective end of the torsion axle. A frame attachment arm is adapted to be attached to the vehicle frame and has an air spring mounting arm operably pivotally attached to the frame attachment arm by a pivot axis. A torsion axle is received in an axle receiving portion of the air spring mounting arm and has an axis spaced a shorter distance from the pivot axis of the air spring mounting arm than taught by prior art air spring—torsion axle suspension systems, preferably in the range of between 3 and 6 inches. The air spring is operatively disposed between the frame mounting bracket and the air spring mounting arm and is spaced a shorter distance from the axis of the air spring mounting arm, preferably in the range of between 11 and 14 inches than prior art suspension systems. A spindle arm is operably attached to the outer end of the torsion axle and has a wheel spindle extending outwardly from a distal end of the spindle arm generally aligned with the air spring. A portion of the air spring is always located between the axis of the spindle and out of contact with the air spring mounting arm instead of outboard or beyond the spindle axis as in the prior art.

Thus, in accordance with one of the main features of the present invention, the short distances between the air spring support arm pivot axis and the torsion axle axis, and to the centerline of the air spring provides a vehicle suspension assembly which is of a compact and sturdy construction, which is adapted to be secured to the vehicle frame of the vehicle and supports one end of a torsion axle which extends across the vehicle between the spaced vehicle wheels, and which has a stub shaft pivotally mounted by elastomeric members within the interior of the torsion axle at each end of the axle, wherein the stub shaft is attached at an outer end to a spindle arm and has an air spring extending between the frame mounting bracket and the distal end of a mounting lever.

The improved suspension assembly provides good ride, excellent stability, axle-to-axle equalization and the ability to raise and lower the trailer for easier loading and unloading. Also, the combination of rubber and air in series provided by the torsion axle and air spring, respectively, ensures that the vehicle has some suspension and isolation even if the air system is not inflated or fails for any reason. Furthermore, the axle-to-axle equalization allows the use of torsion axles on multi-axle trailers that currently allow only single axle and tandem axle applications. The compact design is easily adaptable for capacities from 2,300 lbs to over 10,000 lbs. If desired, optional shock absorbers, air controls etc. can be incorporated easily into the final suspension assembly.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 21 is a perspective view of the second embodiment of the suspension assembly.

FIG. 22A is a view of the second embodiment of the suspension assembly in the design position under no loads and with the spindle arm at approximately a zero degree angle with respect to horizontal.

FIG. 26A is a cross-sectional view of the second embodiment of the suspension assembly at the start of a reaction to an upward force.

FIG. 27A is a cross-sectional view of the second embodiment of the suspension assembly at the start of a reaction to a downward force.

FIG. 27B is a cross-sectional view of the second embodiment of the suspension assembly in the full rebound position in reaction to the downward force.

Similar numbers refer to similar parts throughout the drawings.

DETAILED DESCRIPTION OF THE INVENTION

Figure 1:
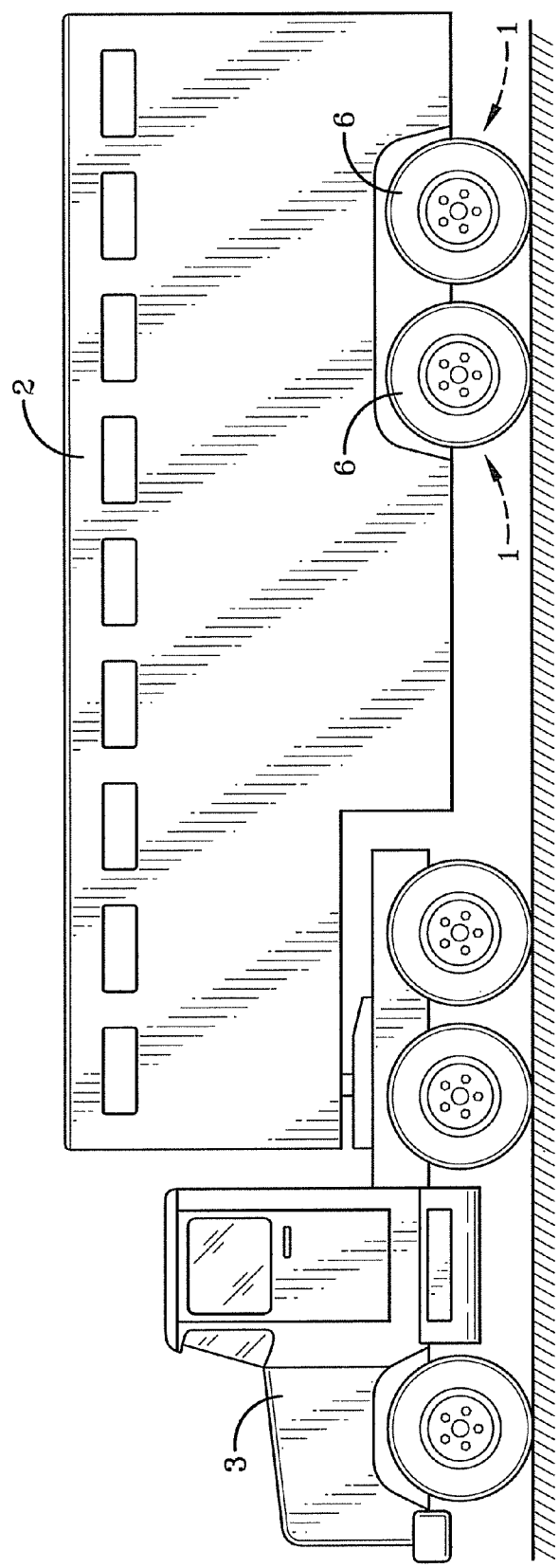
FIG. 1 is a diagrammatic side elevational view of a vehicle trailer on which the improved suspension assembly is mounted.
Figure 2:
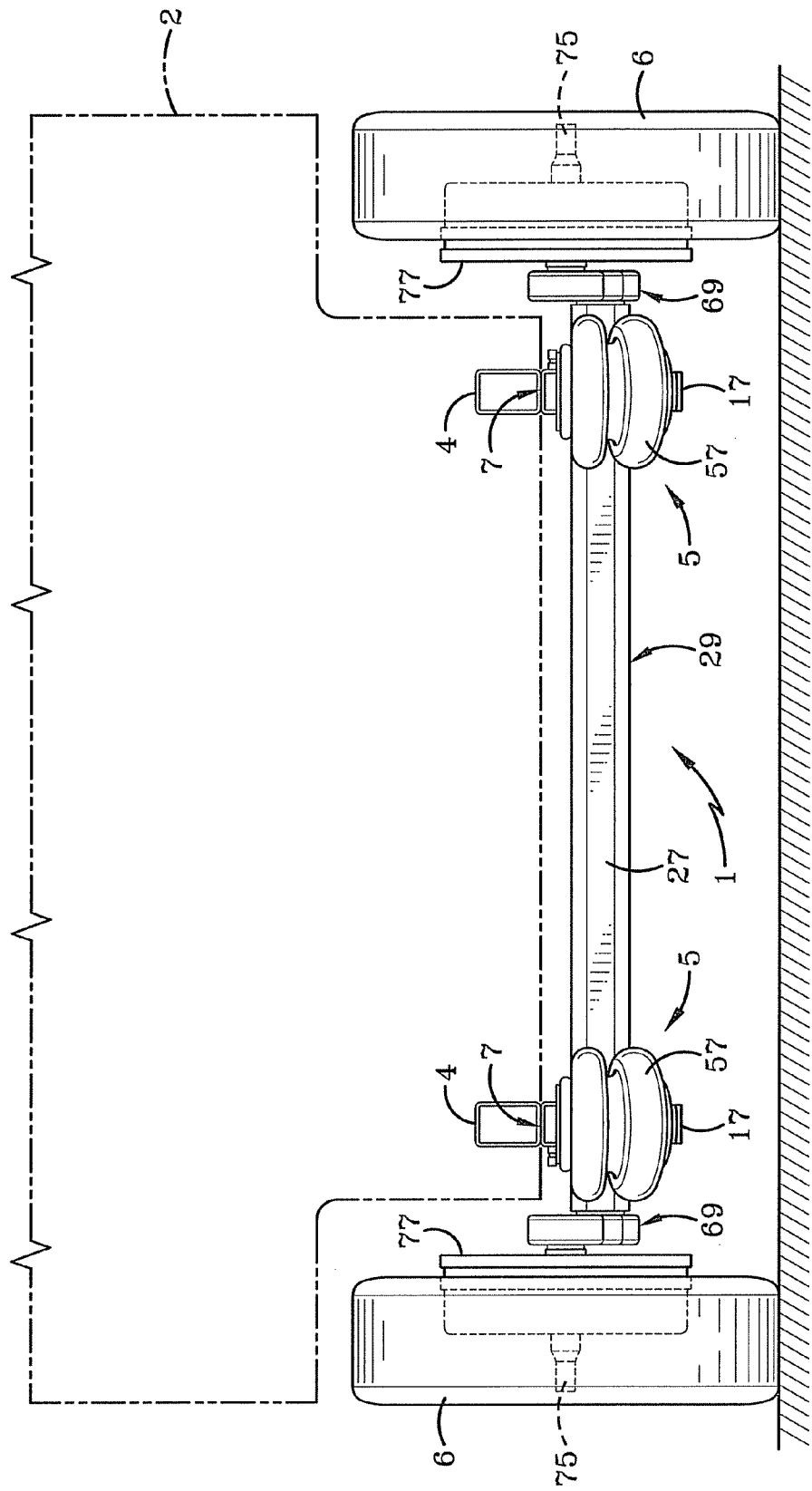
FIG. 2 is a rear elevational view of a pair of the improved suspension assemblies mounted on a trailer shown in dot dashed lines.
Figure 3:
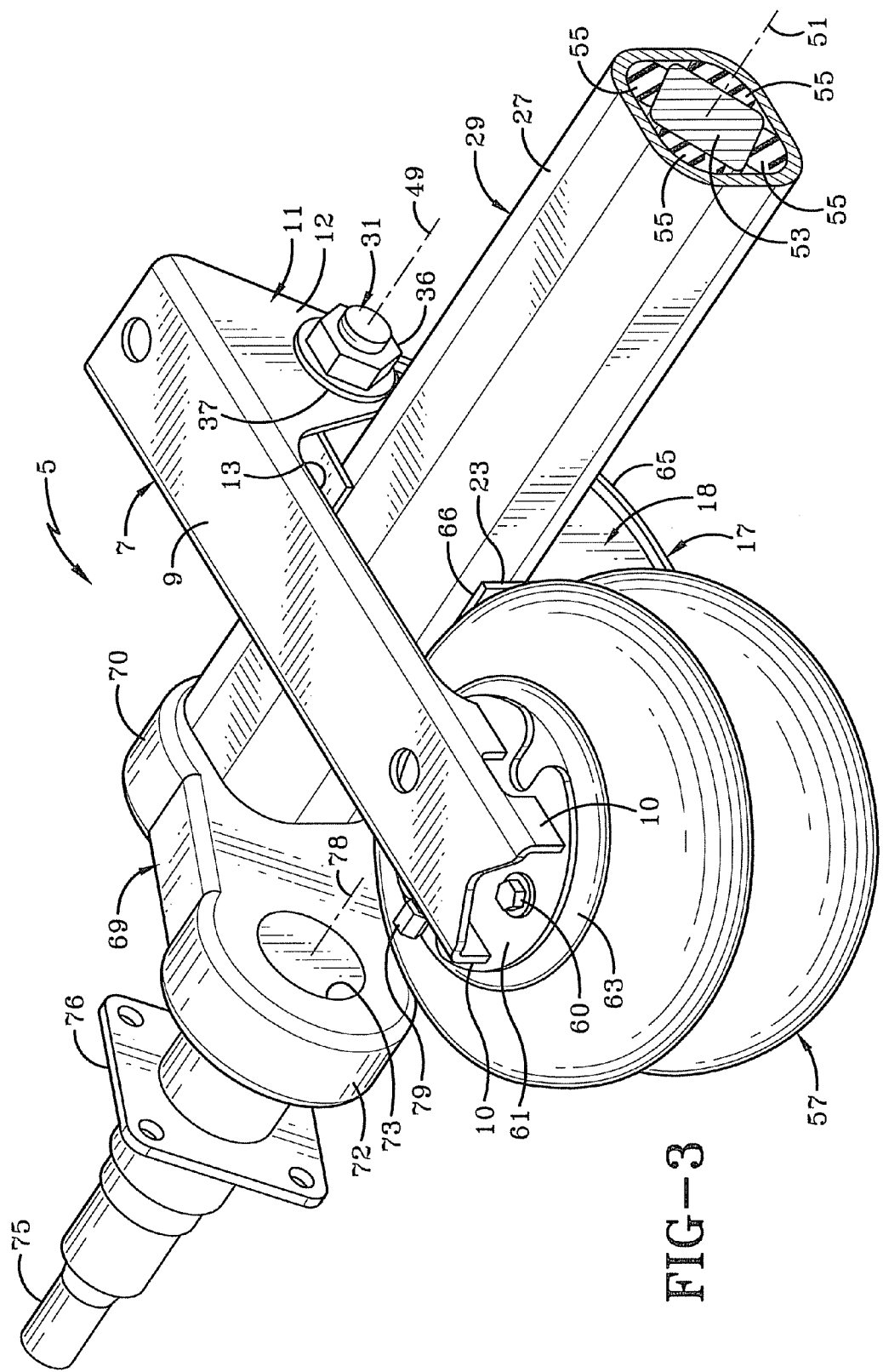
FIG. 3 is a perspective view of the improved vehicle suspension assembly of the present invention.

A vehicle suspension system 1 is indicated generally in FIG. 1. A first embodiment a suspension assembly 5 associated with the suspension system 1 is shown particularly in FIGS. 2-13. A second embodiment of a suspension assembly 105 associated with the suspension system 1 is shown in FIGS. 29-38. The suspension assembly 5 is mounted on a vehicle 2, such as a trailer of the type being towed by a tractor 3. Trailer 2 is supported on a pair of frame rails 4 extending longitudinally along a length of the trailer (FIG. 2). A pair of the improved suspension assemblies, each indicated generally at 5, is mounted on a respective frame rail 4 generally adjacent a wheel 6. Suspension assembly 5 as best shown in FIG. 3, includes a frame mounting bracket 7 which is secured to one of the trailer frame rails 4 by a plurality of bolts, by welding or other types of attachments. Frame mounting bracket 7 preferably has a U-shaped channel configuration with web wall 9 and a pair of spaced legs 10 terminating at one end in a depending end flange portion 11 (FIGS. 3 and 8) formed by a pair of spaced flange legs 12. Frame mounting bracket 7 may be formed with a central cutout 13 and preferably has a plurality of reinforcing gussets 15 extending between each of the flange legs 12.

An air spring support arm indicated generally at 17, includes a pair of spaced support arm members 18, each of which has a curved generally L-shaped configuration (FIG. 7) with an upstanding upper mounting leg 19 and an elongated leg 21 extending outwardly angularly therefrom. A reinforcing plate 23 is connected to and extends along and between the top edges of arm members 18 and preferably is welded thereto. Each support arm member 18 is formed with an L-shaped cutout opening 25 complementary to an outer tube 27 of a torsion axle 29 which is secured therein by welding or other attachment means.

Air spring support arm 17 is pivotally mounted between flange legs 12 by a pivot bolt 31 (FIGS. 7-9) which extends through aligned holes 33 formed in flange legs 12 and includes a head 35 and a securement nut 36 which are spaced from flange legs 12 by washers 37. Preferably, a metal sleeve 39 is mounted on bolt 31 and is located within the bore 41 of an elastomeric bushing 43. Bushing 43 is located within an outer annular collar 45 which is secured within a generally semicircular cutout 47 formed in support arm members 18 and secured thereto by welds or other types of attachment means. Air spring support arm 17 has a pivot axis 49 which is spaced from and parallel with axis 51 of torsion axle 29 which is coaxial with the axis of outer tube 27 and a stub shaft 53 which is rotatably mounted within outer tube 27 by a plurality of elastomeric members 55. A stub shaft 53 is mounted within each end of torsion axle 29 by elastomeric members 55. Torsion axle 29 is similar to a well-known torsion axle, one type being sold under the trademark TOR FLEX® from Dexter Axle.

Figure 8:
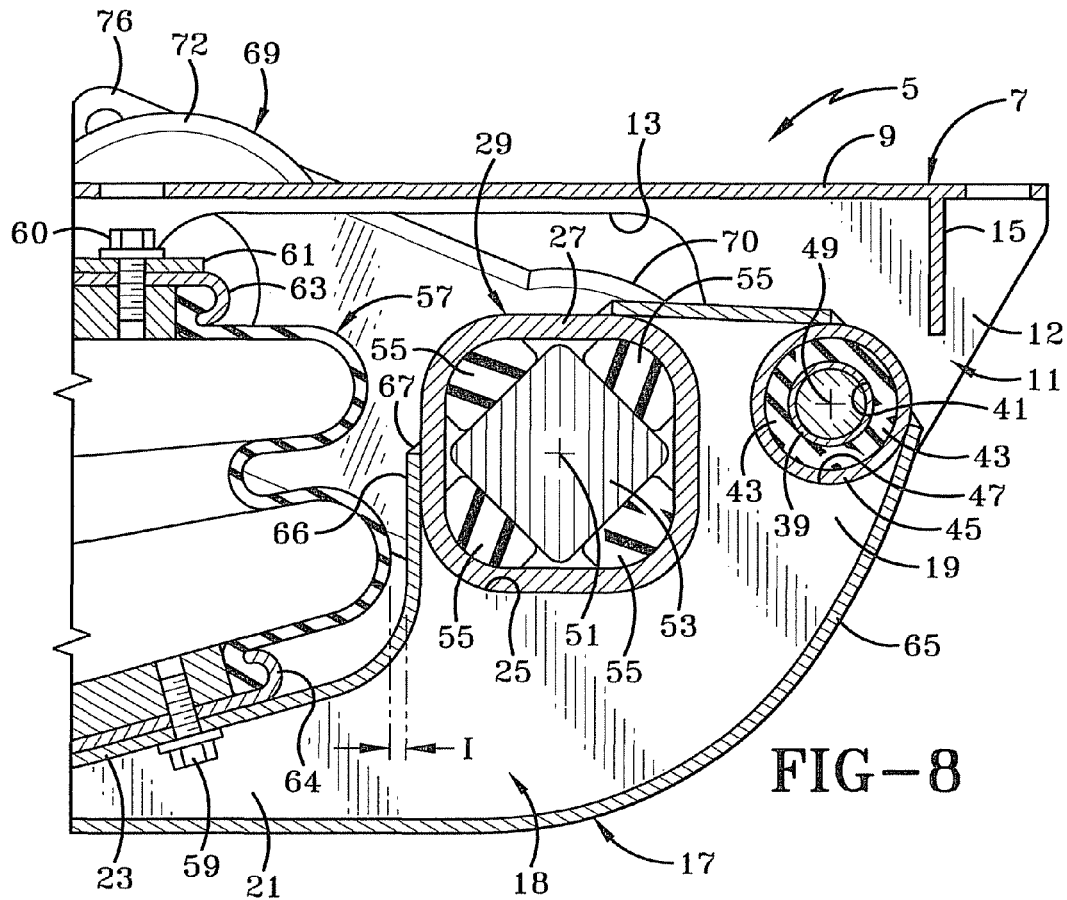
FIG. 8 is an enlarged sectional view taken on line 8-8, FIG. 5.
Figure 9:
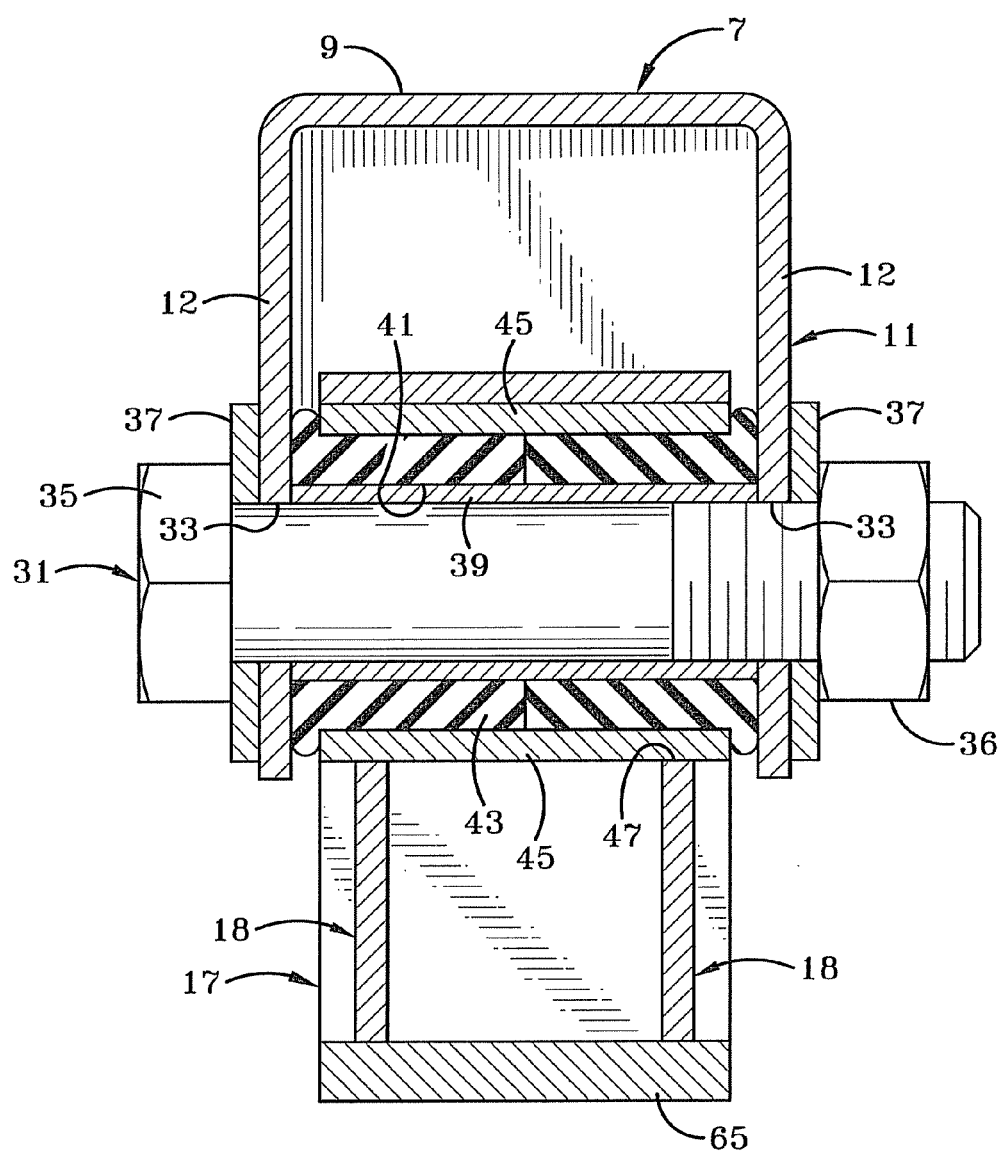
FIG. 9 is a greatly enlarged sectional view taken on line 9-9, FIG. 7.

An air spring 57 is secured at its lower end to reinforcing plate 23 by a plurality of bolts 59 (FIG. 8) and at its upper end by bolts 60 to a plate 61, which as shown in FIGS. 3 and 8, is secured to the top end plate 63 of air spring 57. Plate 61 extends beneath and is welded to the bottom edges of legs 10 of U-shaped flange frame mounting brackets 7. Air spring 57 is of a usual well-known construction having a flexible outer sleeve forming an internal air chamber.

A reinforcing plate 65 extends across the bottom edges of air spring arm members 18 and terminates and is secured to collar 45 by welding as shown in FIG. 8. Top reinforcing plate 23 terminates in an upwardly curved end 66 which is secured to outer tube 27 of torsion axle 29 by welds 67 or other attachment means. This provides for a sturdy and rigid air spring support arm 17 pivotally mounted on frame mounting bracket 7 by pivot bolt 31 and secured to outer tube 27 of torsion axle 29.

Figure 4:
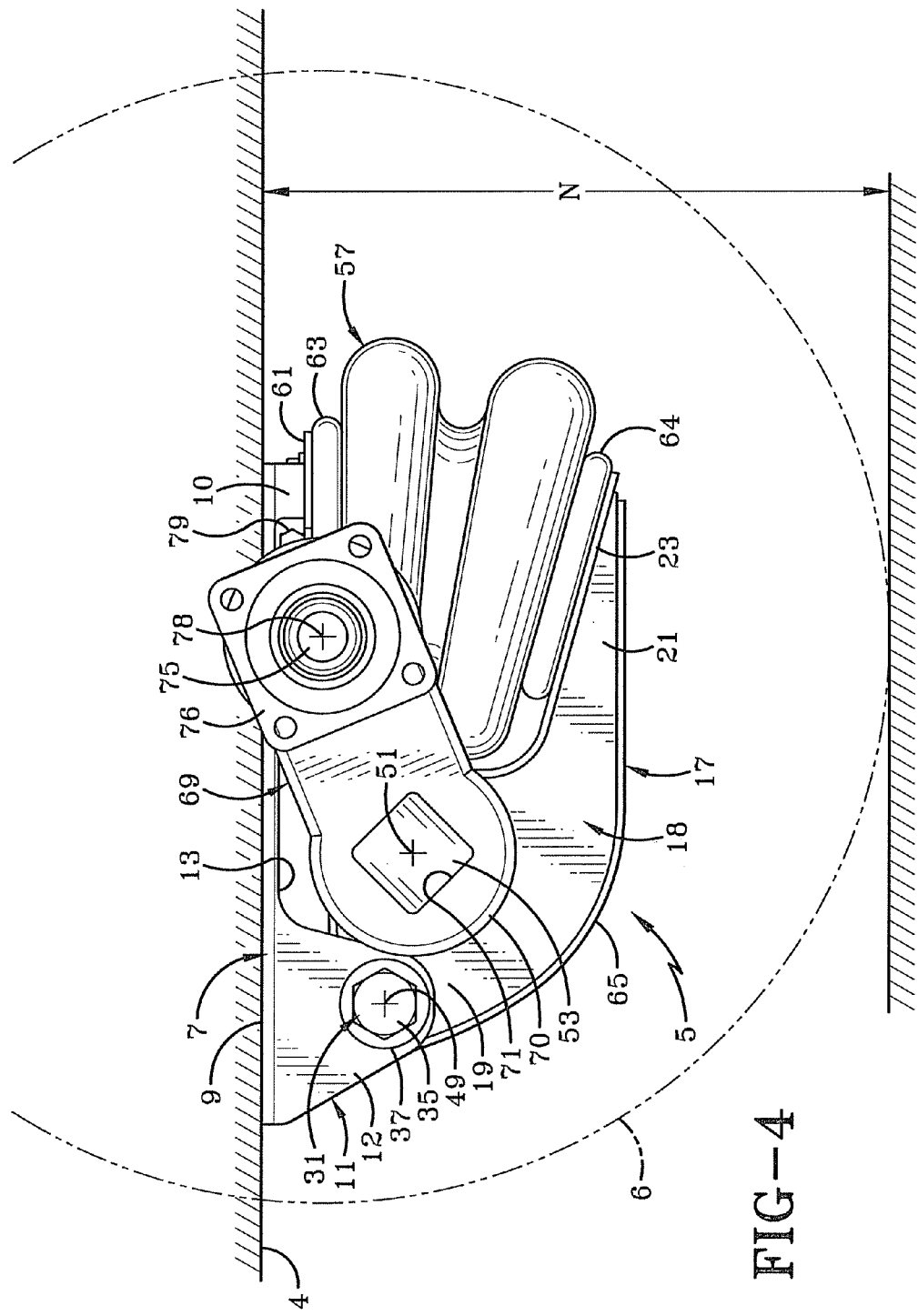
FIG. 4 is a side elevational view of the suspension assembly mounted on a vehicle with a ground engaging tire shown in dot dashed lines.
Figure 5:
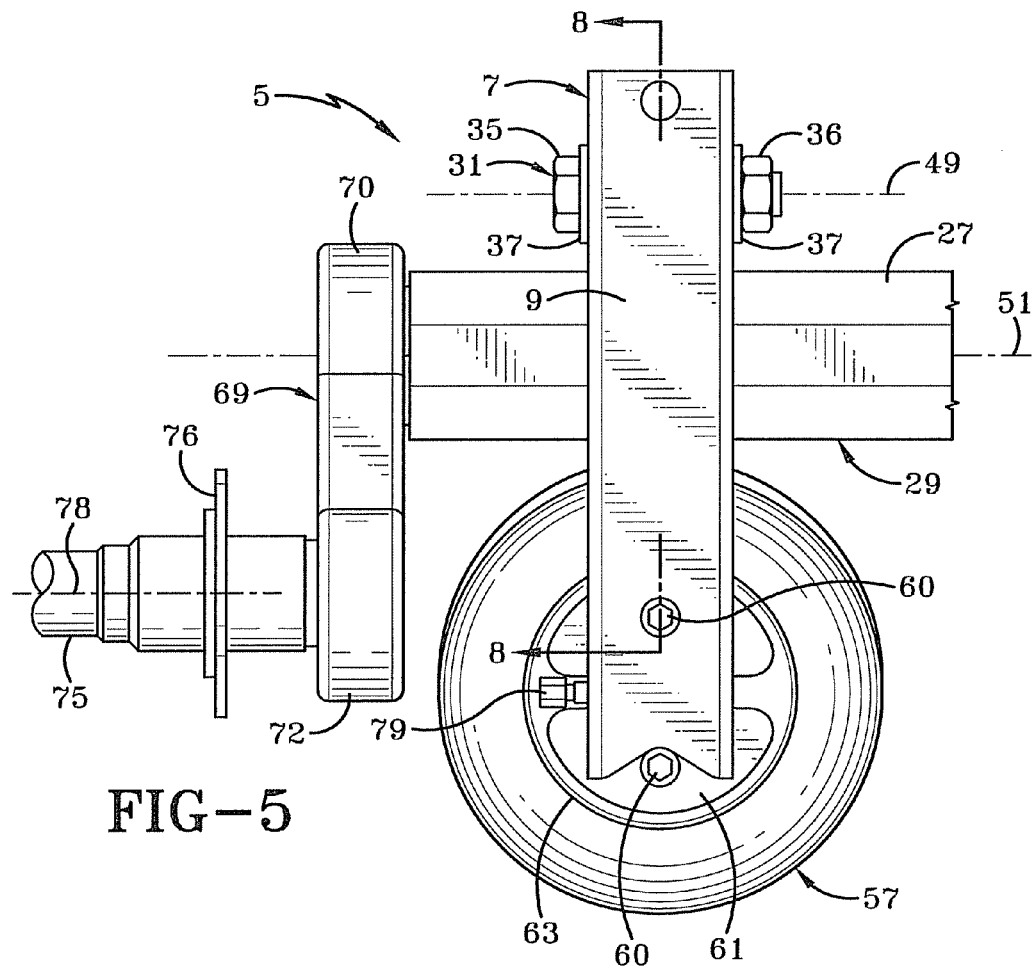
FIG. 5 is a top plan view of the improved vehicle suspension assembly.

A spindle arm indicated generally at 69 (FIG. 3), is attached at one end 70 to stub shaft 53 of torsion axle 29 preferably by welding, after the stub shaft extends through a complementary-shaped opening 71 formed in spindle arm end 70 (FIG. 4). Opening 71 may be a variety of shapes including rectangular without departing from the spirit of the present invention. The opposite or distal end 72 of spindle arm 69 is formed with a circular opening 73 (FIG. 3) in which one end of a spindle 75 is secured preferably by welds. A hub assembly mounting plate 76 is secured to spindle 75 for subsequent attachment of a wheel hub 77 thereto as shown in FIG. 2.

Figure 6:
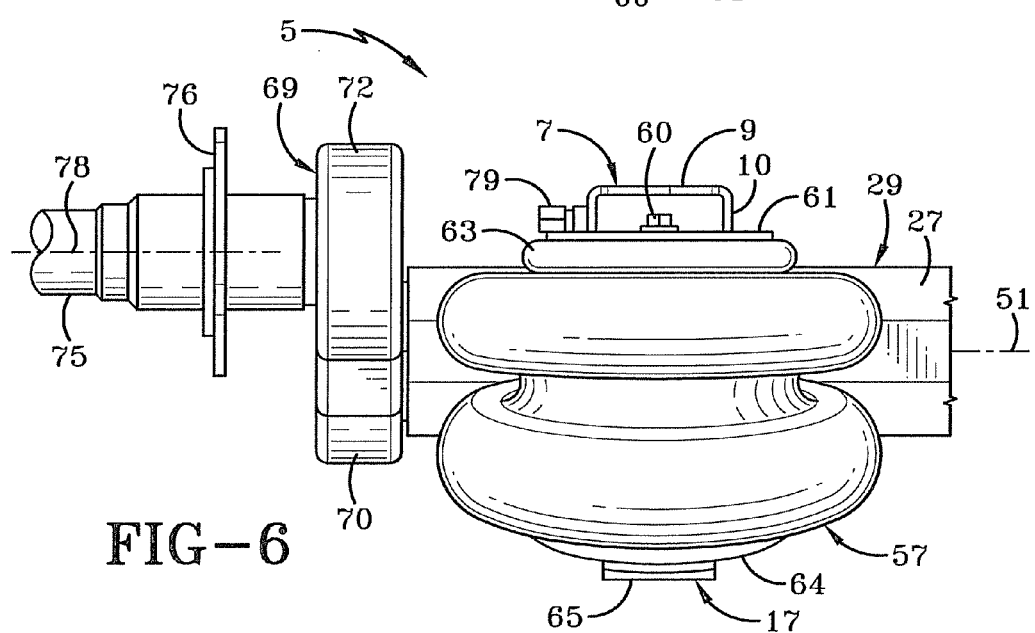
FIG. 6 is a rear elevational view of the suspension assembly of FIG. 5.
Figure 7:
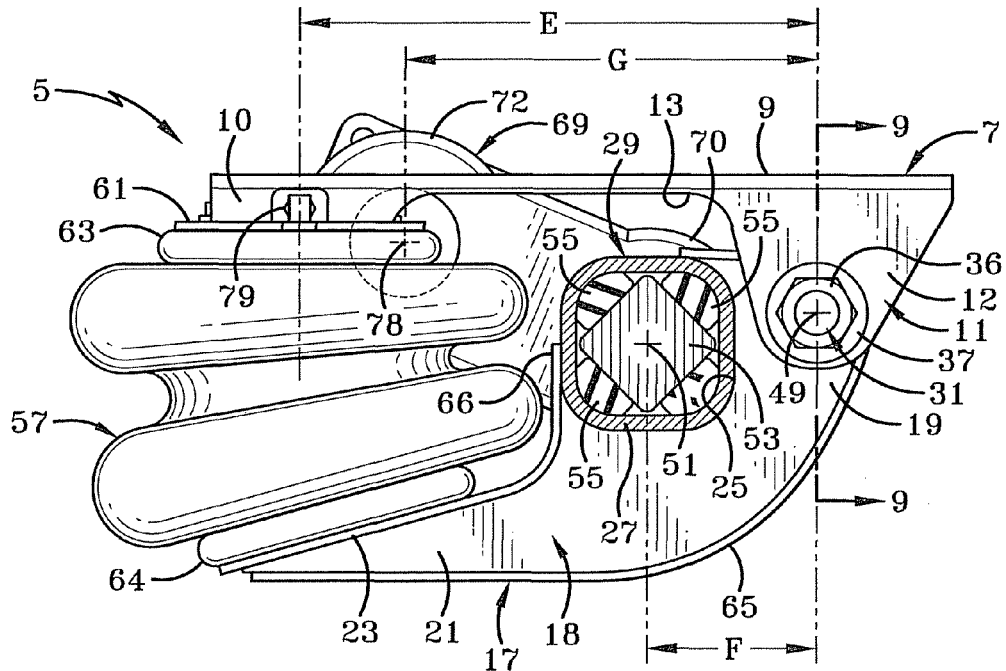
FIG. 7 is a side elevational view of the suspension assembly with the torsion axle shown in cross section.

Air spring 57 is shown as a double convolute air spring, but could be single or plural convolute air spring without affecting the concept of the invention. Furthermore, the air spring can use various types of internal fluid for its operation, although air is the preferred fluid which is supplied to the internal fluid chamber from a compressor (not shown) usually mounted within the tractor or trailer and connected to a coupler 79 by an air supply line (not shown). Coupler 79 is mounted on top end plate 63 of the air spring as shown in FIG. 6.

Figure 10:
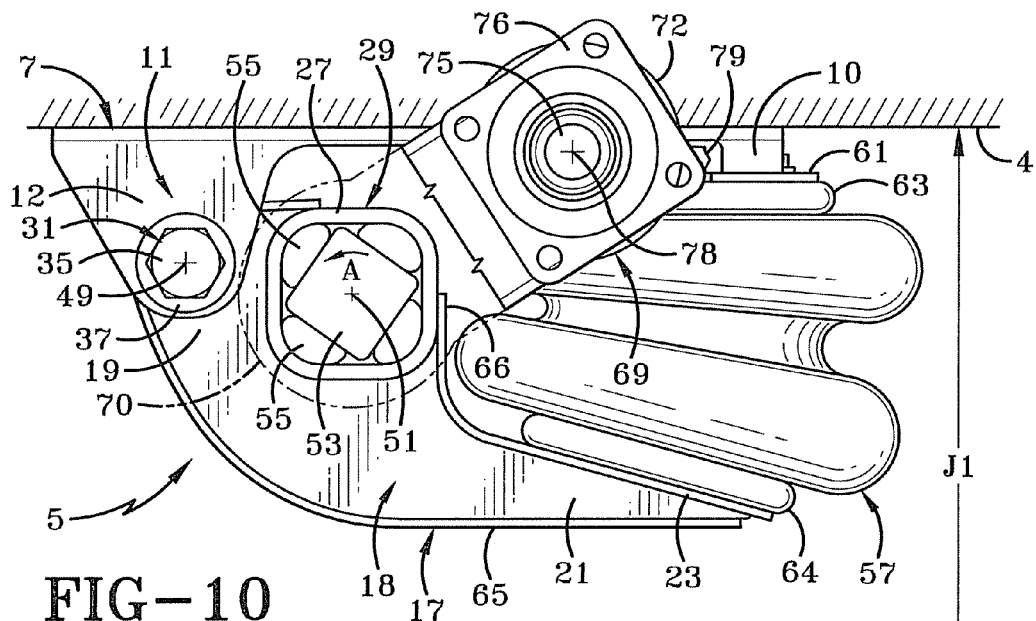
FIG. 10 is a side elevational view of the vehicle suspension assembly at the start of a jounce movement.
Figure 11:
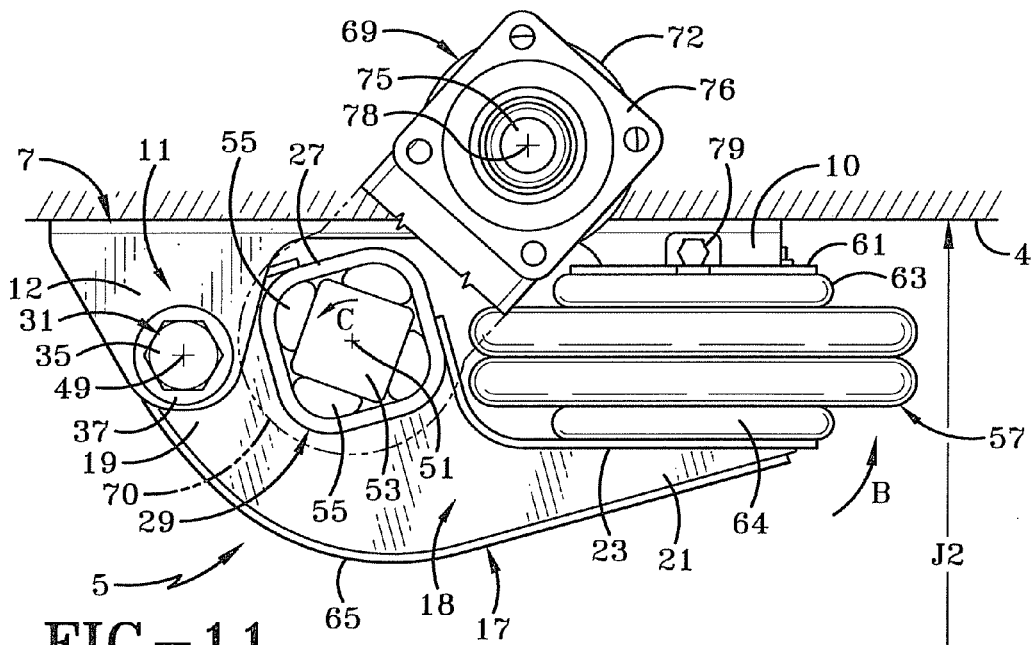
FIG. 11 is a view similar to FIG. 10 with the vehicle suspension assembly in a full jounce position.
Figure 12:
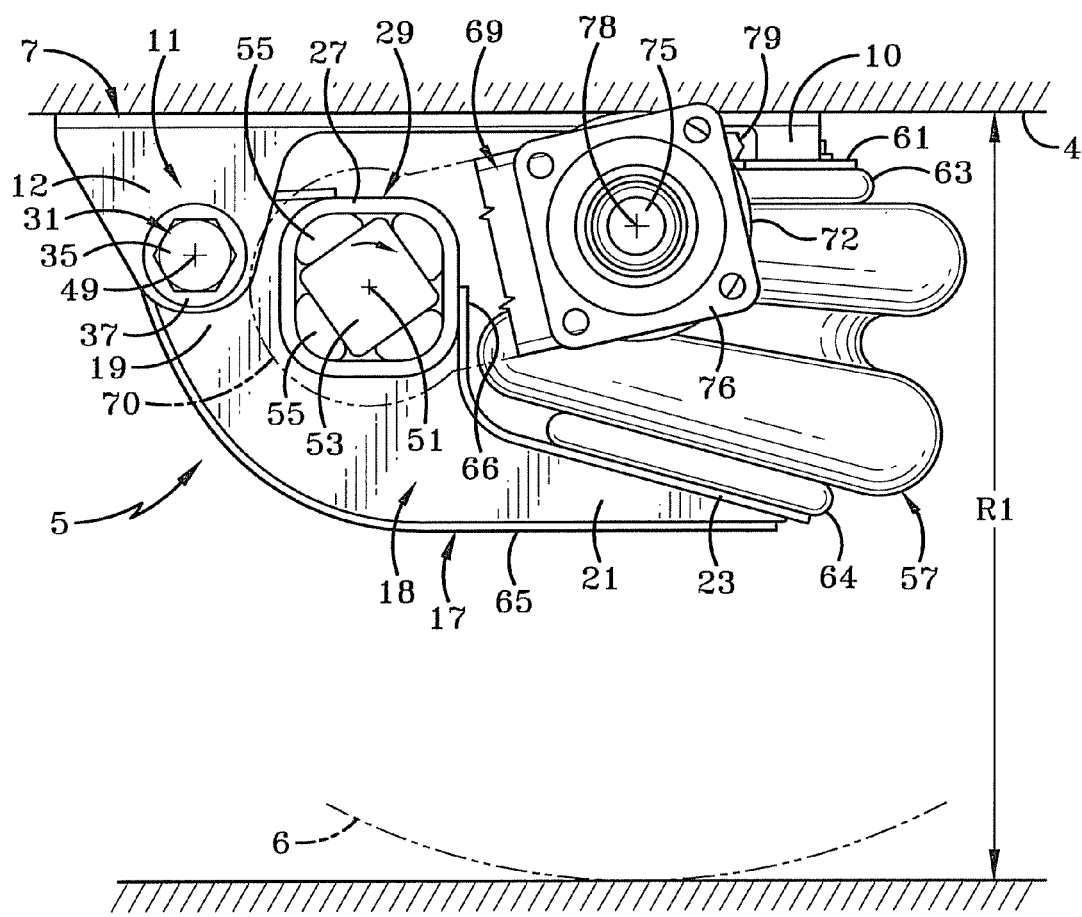
FIG. 12 is a view similar to FIGS. 10 and 11 with the vehicle suspension assembly starting to move toward the rebound direction.
Figure 13:
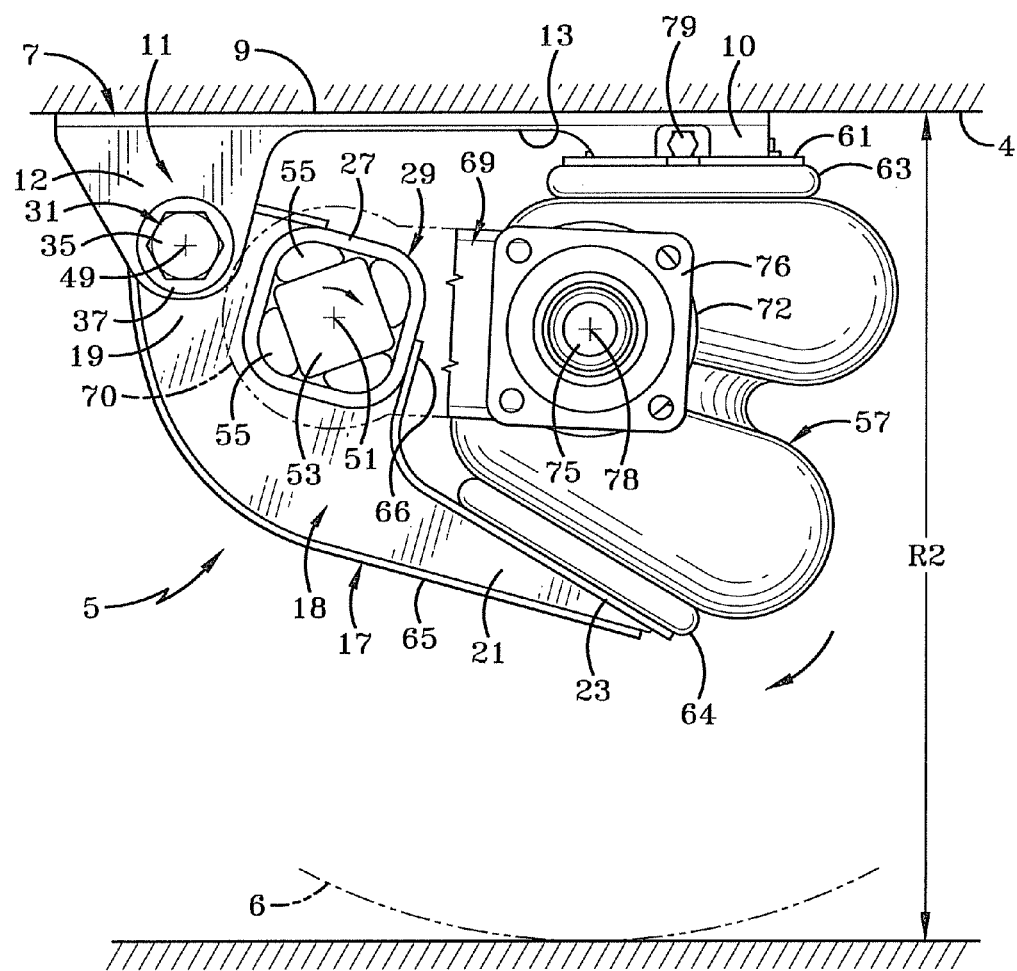
FIG. 13 is a view similar to FIGS. 10-12 with the vehicle suspension assembly in the full rebound position.

The manner of operation of suspension assembly 5 is best shown in FIGS. 10-13. FIG. 10 shows the position of air spring 57 and support arm 17 at the start of a jounce movement whereas only a slight rotational force indicated by Arrow A, is applied to stub shaft 53 that is absorbed by the elastomeric members 55 without air spring 57 experiencing any substantial movement. FIG. 11 shows both the torsion axle, and in particular stub shaft 53 and the air spring, in a nearly full jounce position as shown by the counterclockwise pivotal movement of air spring support arm 17 in the direction of Arrow B and the rotational movement of stub shaft 53 in the direction of Arrow C. FIG. 12 shows the start of the rebound of the suspension assembly. Rebound is a result of recovery, that is, return of energy stored in the suspension system of both the air spring and rubber springs or elastomeric members 55 in the torsion axle from inputs from bumps, etc. The springs try to return to their original heights but due to inertia in the system may travel beyond into a position which extends them to their limit. FIG. 13 shows the full rebound position where stub shaft 53 and its associated elastomeric members 55 and air spring 57 provide the desired stability to the suspension assembly by absorbing the various twisting and up and down or side to side movement exerted on the trailer wheels. The independent side-to-side absorption or compliance of the rubber torsion system provides roll control for stability and diagonal compliance to allow the suspension assembly to function on uneven terrain. This allows the suspension assembly to travel over one wheel bumps or encounter diagonal bumps.

Figure 14:
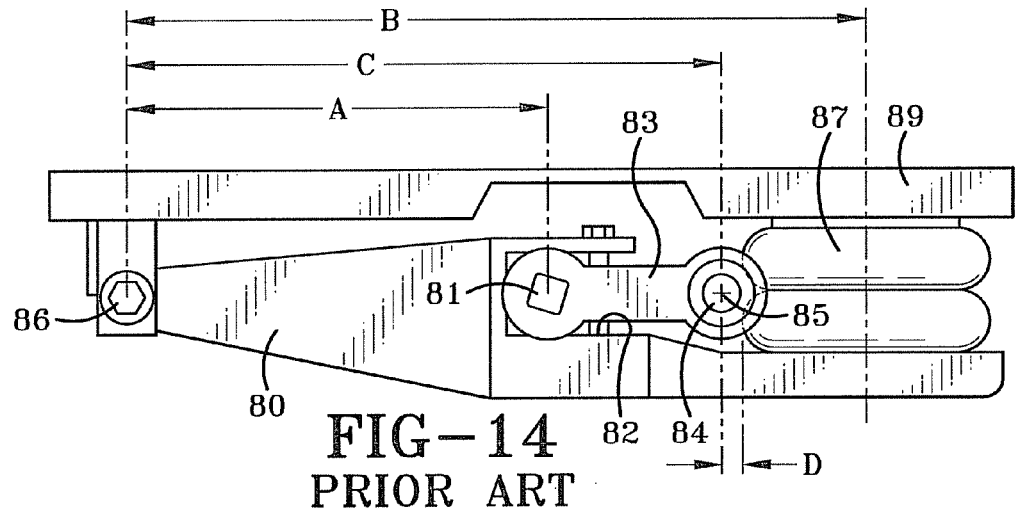
FIG. 14 is a diagrammatic side elevational view of a prior art combination air spring—torsion axle suspension assembly upon which the present invention is an improvement thereon.

Suspension assembly 5 of the present invention achieves all of the advantages achieved by the combination air spring—torsion axle suspension system described in U.S. Pat. No. 6,340,165, the contents of which are incorporated herein by reference. However, suspension system 5 provides considerable advantages over that of the suspension system of U.S. Pat. No. 6,340,165 by considerably reducing the length of the air spring mounting arm and moving the air spring closer inboard or forward to the pivot axis of the torsion axle and the pivot axis of the air spring support arm. FIG. 14 is a diagrammatic view of the suspension system of U.S. Pat. No. 6,340,165 which as shown therein has a long air spring support arm 80 which supports the stub shaft 81 of a torsion axle which is mounted within a cutout 82 of support arm 80. A spindle arm 83 is attached at one end to stub shaft 81 and has a spindle 84 attached to and extending outwardly by an opposite end of arm 83. Spindle 84 has an axis 85. An air spring 87 is mounted on the outer end of support arm 80 with its upper end being connected to a frame mounting bar 89. The suspension system made according to U.S. Pat. No. 6,340,165 has an arrangement as shown in FIG. 14 wherein the distance A between the pivot axis 86 of air spring support arm 80 to the axis of stub shaft 81 is known to be approximately 15 to 17 inches with the distance B between pivot axis 86 and the centerline of air spring 87 being between 26 and 28 inches, with the distance C between pivot axis 86 and axis 85 of spindle 84 being 21 and 23 inches. Also, the outermost surface of any of the convolutes of air spring 87 is always spaced rearward or outboard of spindle axis 85 as shown by distance D. The standard length of spindle arm 83 is 6 inches between axis 85 and the axis of stub shaft 84.

Figure 15:
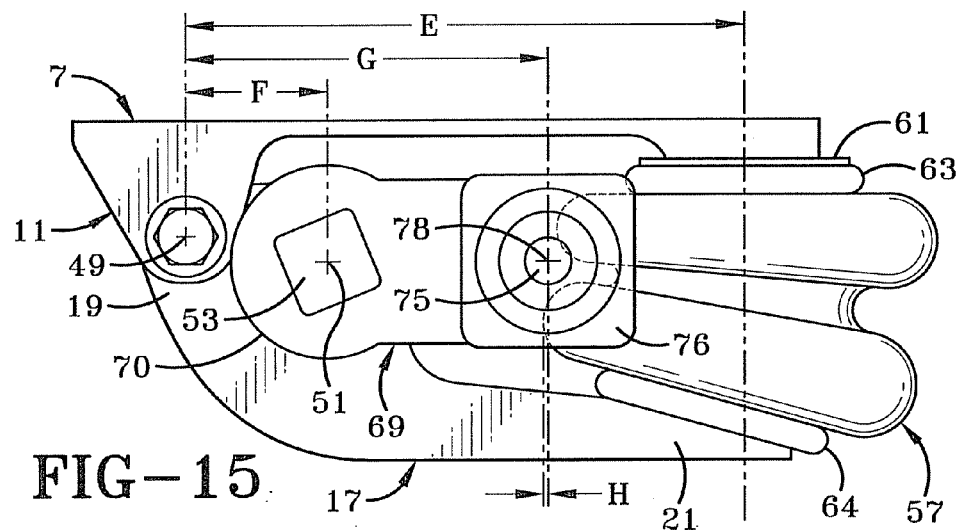
FIG. 15 is a diagrammatic side elevational view of the suspension assembly of the present invention showing the maximum outboard mounting position of the air spring from the axis of the wheel mounting spindle.
Figure 16:
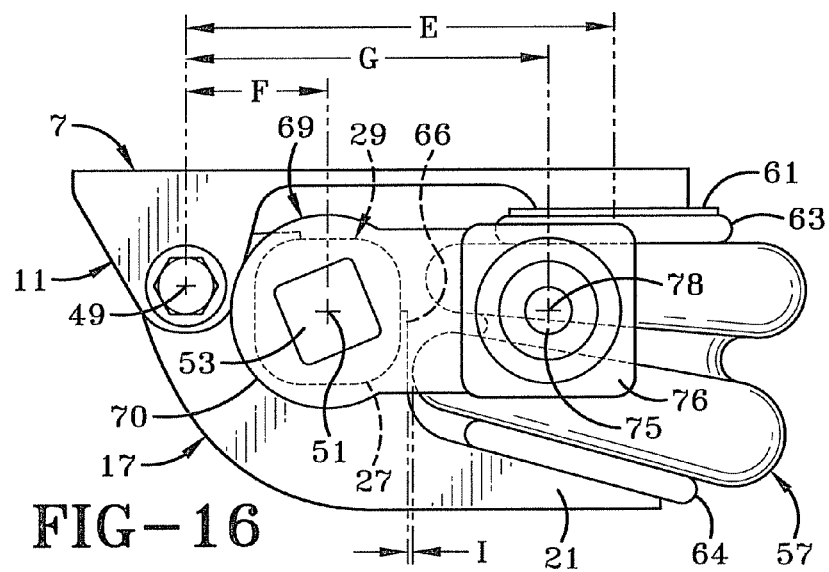
FIG. 16 is a view similar to FIG. 15 showing the minimum inboard mounting distance of the air spring from the outer tube of the torsion axle.

In accordance with one of the main features of the present invention shown particularly in FIGS. 8, 15 and 16, air spring 57 is spaced a considerable distance inboard or forward toward pivot axis 49 of support arm 17 than the suspension assembly of U.S. Pat. No. 6,340,165. This provides a considerably shorter air spring support arm 17 than that of support arm 80 of this prior art suspension assembly. This distance is represented by Dimension E and will have a length of between 11 and 14 inches which is considerably shorter than the known 26 to 28 inches represented by Dimension B of the prior art suspension system. Most importantly, when the air spring is at its maximum outboard or rearward position as shown in FIG. 15, the outer diameter of the air spring, whether it be a single or multiple convolute type of air spring, will always have a portion or distance spaced forward of spindle axis 78, represented by Dimension H in FIG. 15. As shown by distance D in the known prior art suspension system of FIG. 14, the outermost circumference or surface of air spring 87 is always rearward of the spindle axis 85, whereas in the present invention, air spring 57 will always have a portion forward of spindle axis 78, which distance is represented by Dimension H.

In the most compact suspension construction as shown in FIG. 16, air spring 57 will be located forward as much as possible and as close to end flange 66 of reinforcing plate 65

(FIG. 8) a distance represented by Dimension 1 without ever contacting the surface of flange 66. This distance will vary from a distance just slightly greater than 0 inches to approximately 6 inches at its maximum spacing as shown in FIG. 15. It is critical that the air spring, and in particular, the outermost portion of any of the convolutes never contact reinforcing plate end flange 66 since it will cause a rubbing action that will considerably shorten the life of the air spring by rubbing against the plate as the spring continually moves between its rebound and jounce positions. Furthermore, the distance represented by Dimension F between axis 49 of the air spring support arm pivot and axis 51 of the torsion axle will be between 3 and 6 inches whereas in the known prior art suspension system, the similar distance represented by Dimension A (FIG. 14) known to be between approximately 15 and 17 inches. Likewise, in the known prior art suspension system, distance between the pivot axis 86 and the spindle axis 85 represented by Dimension C is known to be between approximately 21 and 23 inches wherein the present invention distance represented by Dimension G will be between approximately 9.5 and 13 inches.

Thus, Applicant's suspension assembly 5 is able to achieve an extremely compact, yet highly efficient suspension assembly by shortening considerably the distance between pivot axis 49 of the air spring support arm 17 and the axis 51 of the torsion axle 29 and by moving air spring 57 forward to be closely adjacent torsion axle 29 as shown in FIG. 8, so long as sufficient spacing is provided between the outer surface of the air spring and surface 66 of the air spring support arm as shown by distance I. Air spring 57 preferably is tucked closely between the support arm pivot and frame mounting bracket and the torsion axle swing arm which also is closely spaced from the pivot of the air spring support arm in contrast to be spaced considerably rearward therefrom in the known prior art as shown in FIG. 14. This short distance shown by Dimension F which is approximately between 3 and 6 inches will provide for a lower torque on axle tube 27 and enable lower stresses to be placed on the various components resulting in a lighter material being utilized since it is subjected to less forces that could cause breakage. Furthermore, this compact arrangement provides for a considerably less total axle movement while providing more total spindle travel. The increased total spindle travel results from the increased angular rotation of the axle and not from vertical travel of the axle. This enables the vertical design position of the axle to be closer to the bottom of the vehicle frame than with prior designs. This closer position of the frame to the axle allows a lower floor height and the shorter beam improves ground clearance, particularly in the rebound position because the rear end of the beam does not swing as far toward the ground and often is not even outside the radius of the tire as with prior art designs.

Thus, suspension assembly 5 provides for a more efficient, lightweight, stronger and more compact construction than the known prior art suspension assembly which utilizes the advantages of both an air spring and torsion axle suspension assembly of the known prior art as shown in U.S. Pat. No. 6,340,165.

In the preferred suspension assembly embodiment the distance of Dimension F is 3.8 inches, the distance of Dimension E is 11.8 inches and the distance of Dimension G is 9.8 inches. The maximum outer diameter of the flexible sleeve which forms the pressure chamber of air spring 57 is 10.4 inches and will be forward of axis 78 a distance of approximately 3.5 inches.

Figure 17:
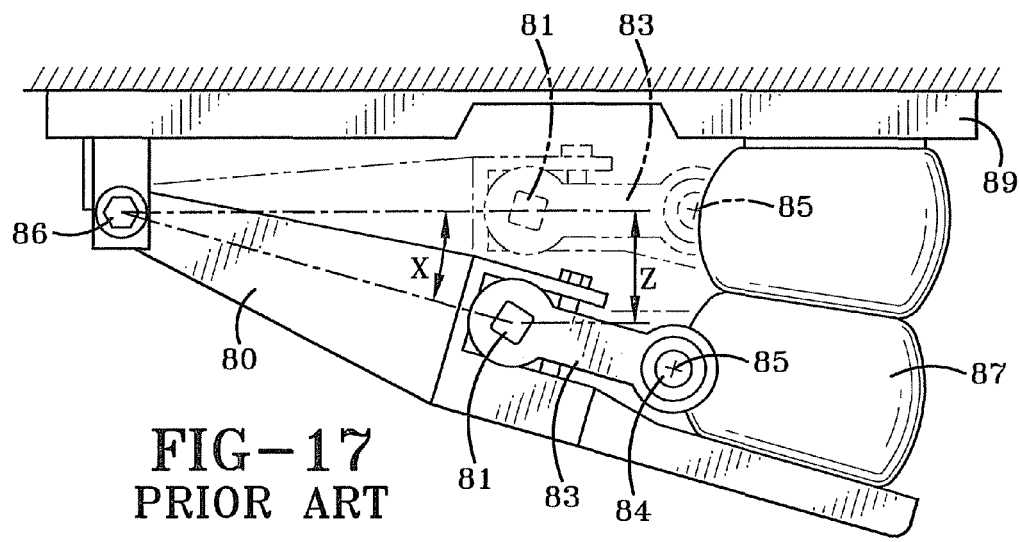
FIG. 17 is a diagrammatic side elevational view of the prior art suspension system showing the vertical travel distance of the torsion axle.

Another advantage of the present invention is that the compact assembly of the suspension limits the vertical travel distance of the torsion axle in comparison to that of the known prior art suspension systems such as shown in U.S. Pat. No. 6,340,165. FIG. 17 shows that in the known prior art suspension system of which the present invention is an improvement thereon, the torsion axle, and in particular the stub shaft 81, will travel through an angular distance X between its full rebound and full jounce positions of between 16° and 19°. This results in the stub axle shaft 81 traveling a generally vertical distance of between 4.79 inches and 4.90 inches as shown by distance Z. This is due to the considerable length of support arm 80 as shown by distance A in FIG. 14.

Figure 18:
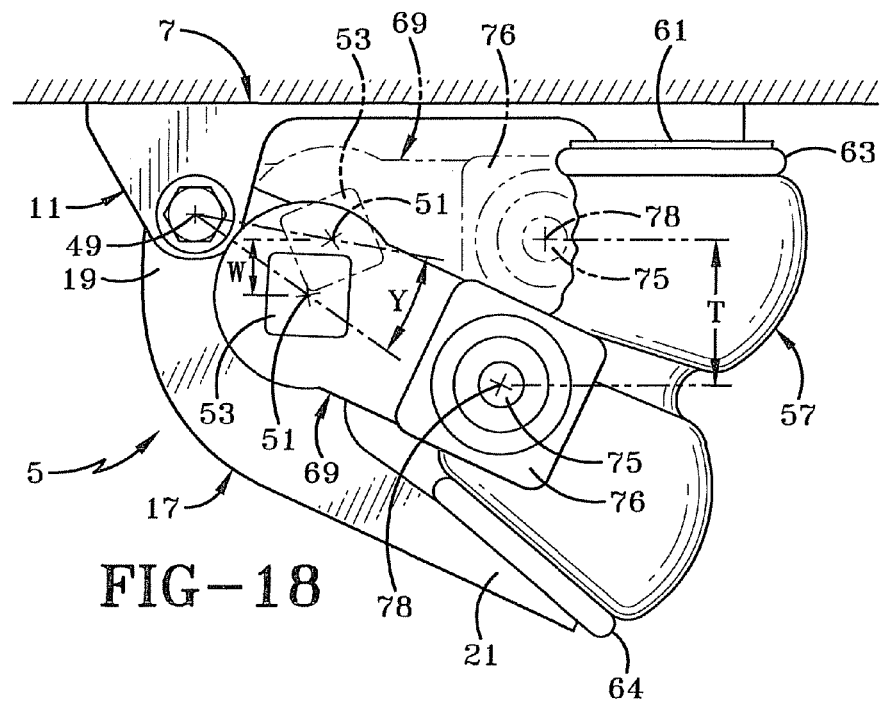
FIG. 18 is a view similar to FIG. 17 showing the vertical travel distance of the torsion axle in the suspension assembly of the present invention.

However, due to the compact condition of suspension assembly 5, the vertical travel of stub shaft 53 shown by distance W, is within a range of 1.95 inches and 3.2 inches, even though stub shaft 53 moves through an angle within a range of 25° to 40° as indicated by angular distance Y. For most suspension systems angle Y will have a preferred range of 30° and 37°. This reduced vertical axle tube travel combined with increased angular rotation of the torsion axle allows a lower design height and a lower frame height compared to prior suspension assemblies. Yet, total spindle travel T (FIG. 18) is increased providing a softer ride and increased bump tolerance. Furthermore, for most suspension assemblies, spindle arm 69 has a length of approximately 6 inches measured between axii 51 and 78. As shown in FIG. 18, this results in spindle axis 78 of spindle arm 69 having a vertical travel distance T within the range of 5 inches and 7 inches.

Also, the shorter distance F compared to the much longer distance A (FIGS. 14, 15 and 16) provides greatly reduced stress in the torsion axle tube 27 when the suspension is subjected to roll or diagonal walk or single wheel bump inputs. The shorter the lever through which these stability forces act, the lower stress on the axle tube and the trailing beam (air spring support beam), the lighter the suspension assembly can be providing for a more efficient design of support arm 17.

Figure 19:
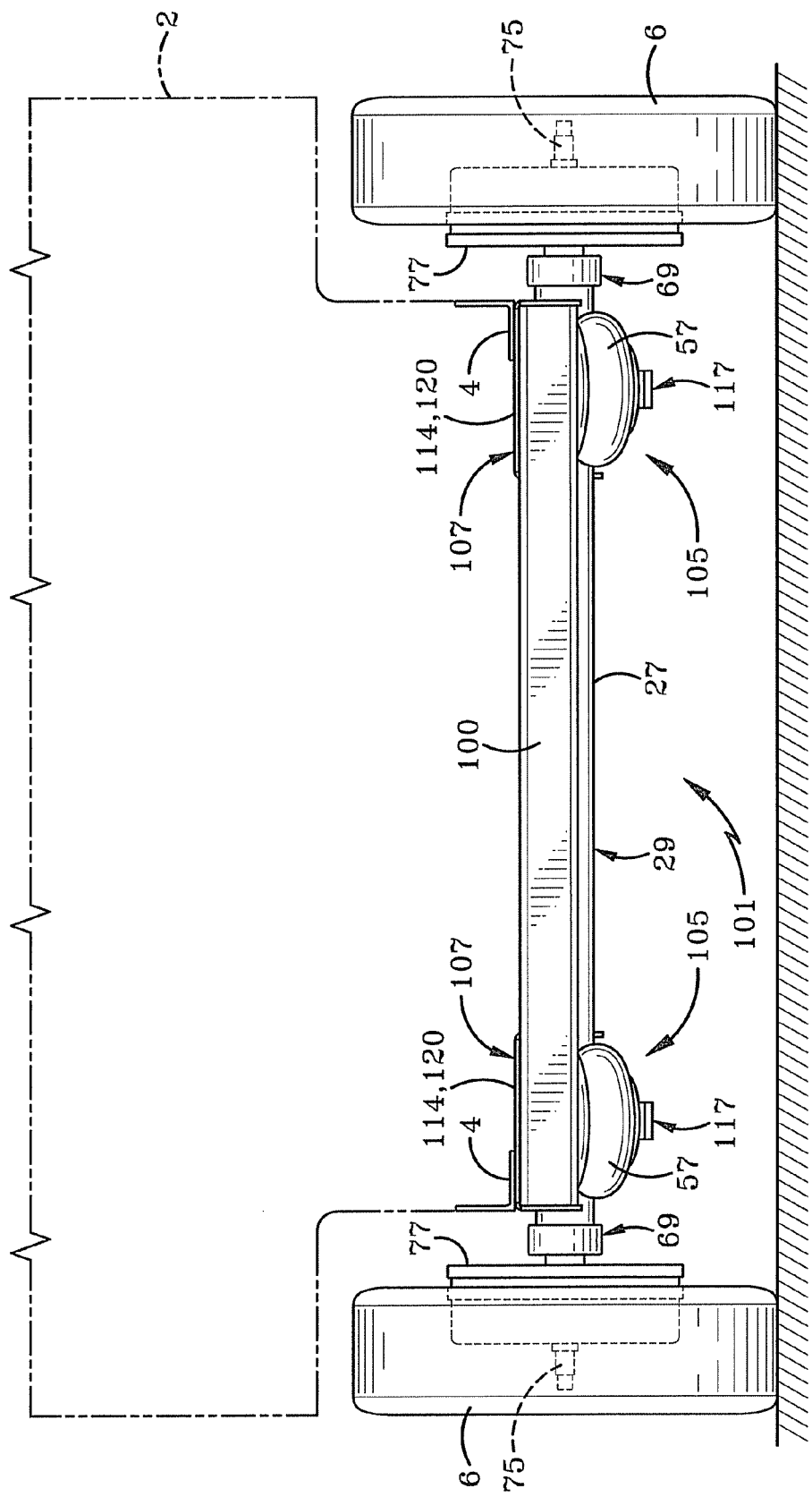
FIG. 19 is a rear view of a suspension system a second embodiment of a suspension assembly.
Figure 20:
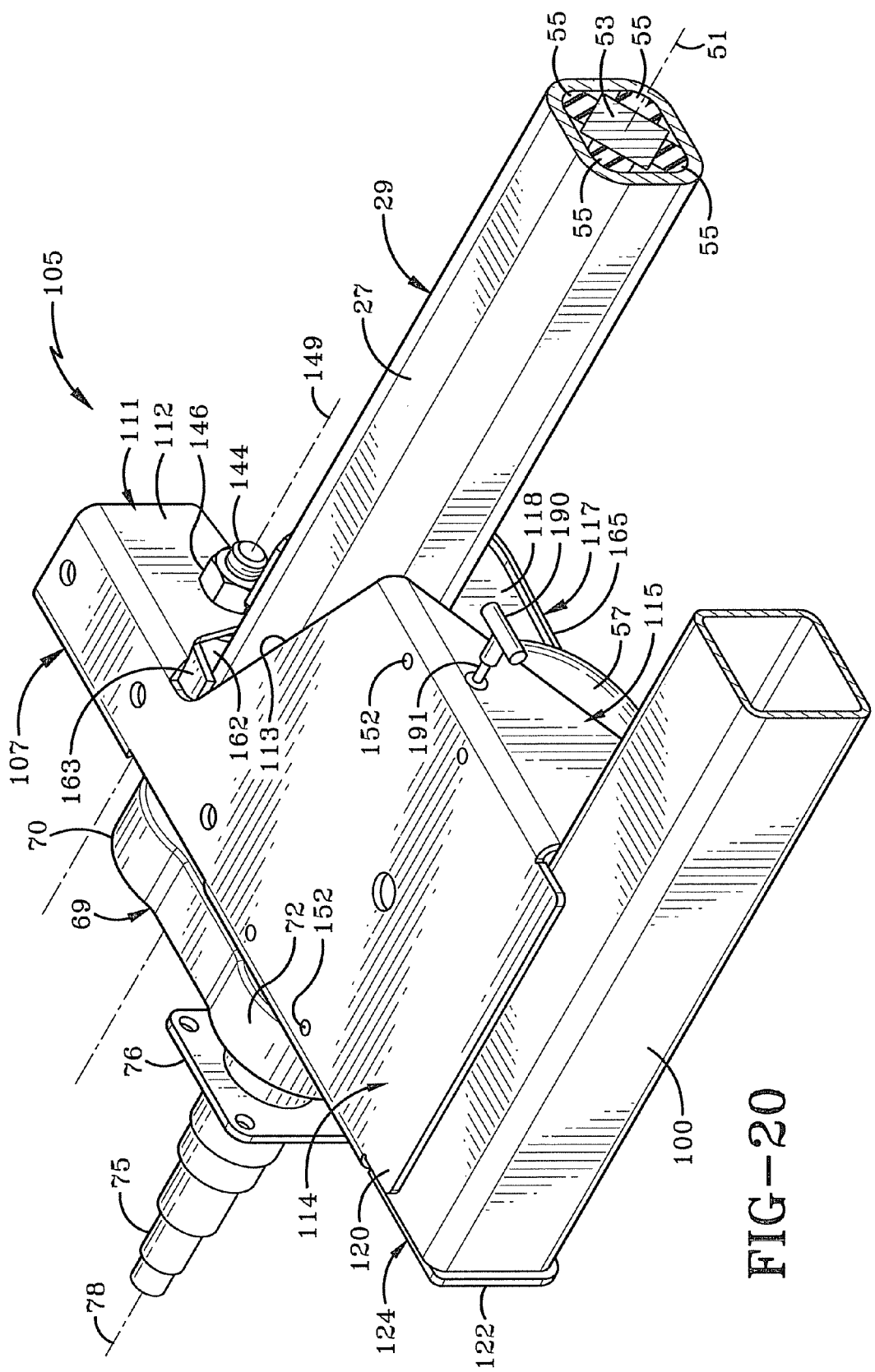
FIG. 20 is a perspective view of the second embodiment of a suspension assembly.

FIGS. 19-28 illustrate a second embodiment of a suspension assembly 105. This suspension assembly 105 is best shown in FIG. 20 and includes a support arm 117 that is similar the support arm 17 of the first embodiment. This embodiment also includes a spindle arm 69, a spindle 75, a mounting plate 76 and an air spring 57 similar to the first embodiment. Unlike the first embodiment, the second embodiment includes a rigid typically metal frame mounting bracket 107 that generally encloses the air spring 57 as well as a rigid typically metal cross-member brace 100. The cross-member brace can improve the suspension system 1 of the trailer 2; however, the cross-member brace 100 is not required and some customers installing the suspension assembly 105 may not install the cross-member brace 100. When the cross-member brace 100 is not installed, the suspension assembly 105 will still perform well.

The frame mounting bracket 107 is secured to one of the trailer frame rails 4 with a plurality of bolts, by welding and/or by other types of attachments. The cross-member brace 100 is attached to the frame mounting bracket 107 and, as shown in FIG. 19, will extend across the trailer 2 to a complementary frame mounting bracket of a second suspension assembly. When installed, the cross-member brace 100 provides a load path for loads to be propagated from one side of the trailer 2 to the other side of the trailer 2. For example, when an upward force is encountered primarily by the right side suspension assembly of the trailer 2, it can then be propagated by the cross-member brace 100 to the left side suspension assembly where it can be projected as a downward force. This can accelerate bringing the suspension system 1 to equilibrium and improve the operating characteristics of the suspension assembly 105.

Figure 28:
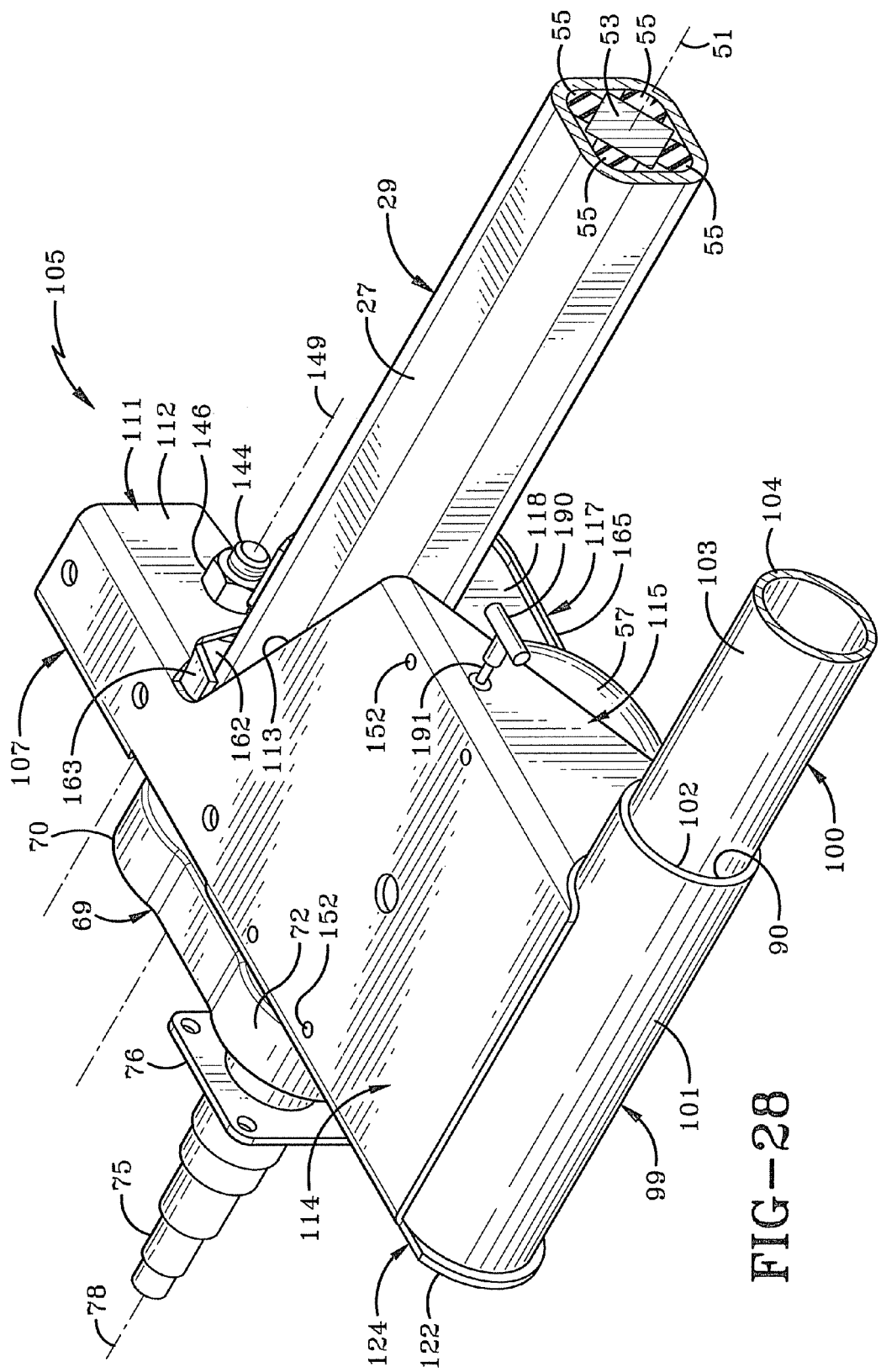
FIG. 28 is a perspective view of a third embodiment of a suspension assembly.

The cross-member brace 100 can have a square cross-section and be made out of hollow metal as shown in FIG. 20 or can have a circular cross-section as shown in FIG. 28. Those of ordinary skill in the art will realize the cross-member 100 can have different shapes, be made out of different materials and may be solid instead of hollow.

Figure 23:
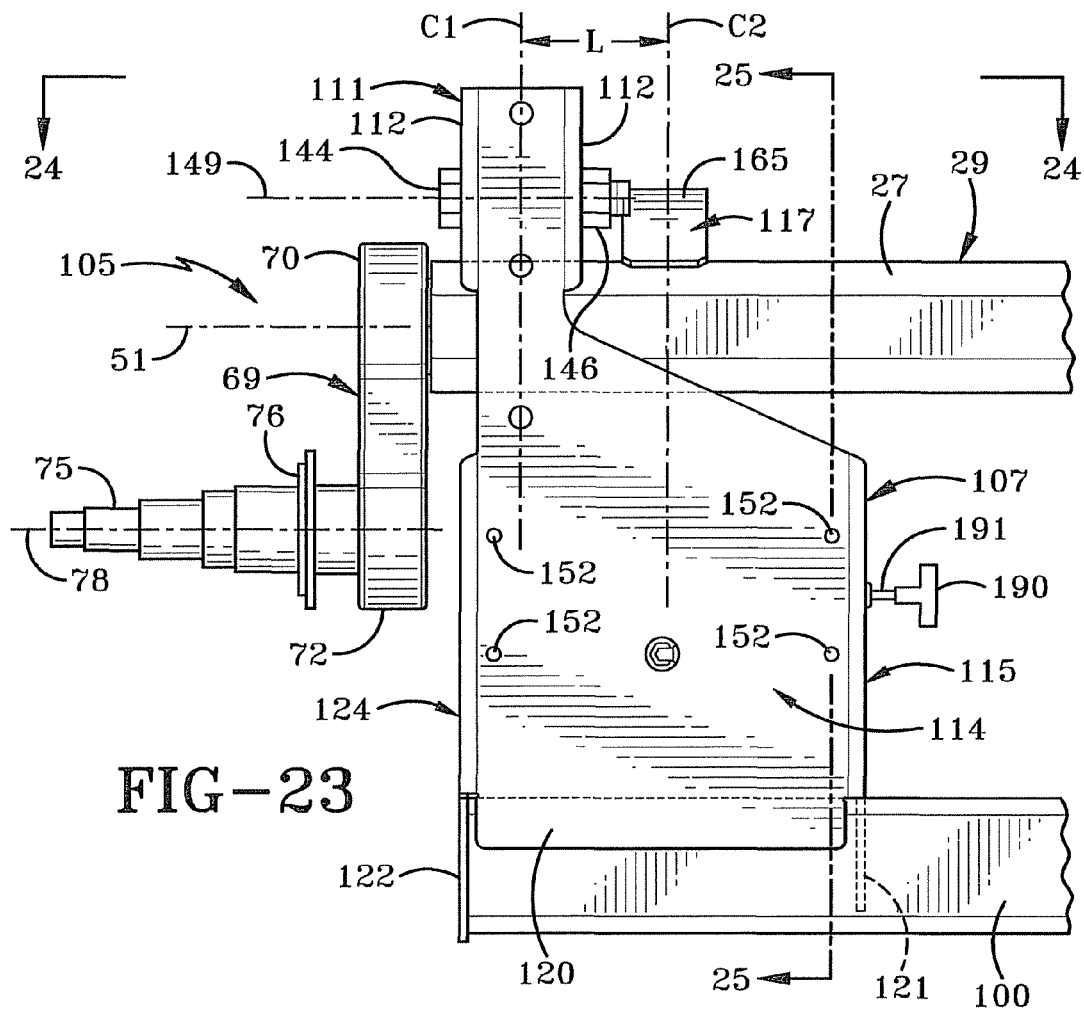
FIG. 23 is a top view of the second embodiment of the suspension assembly.
Figure 24:
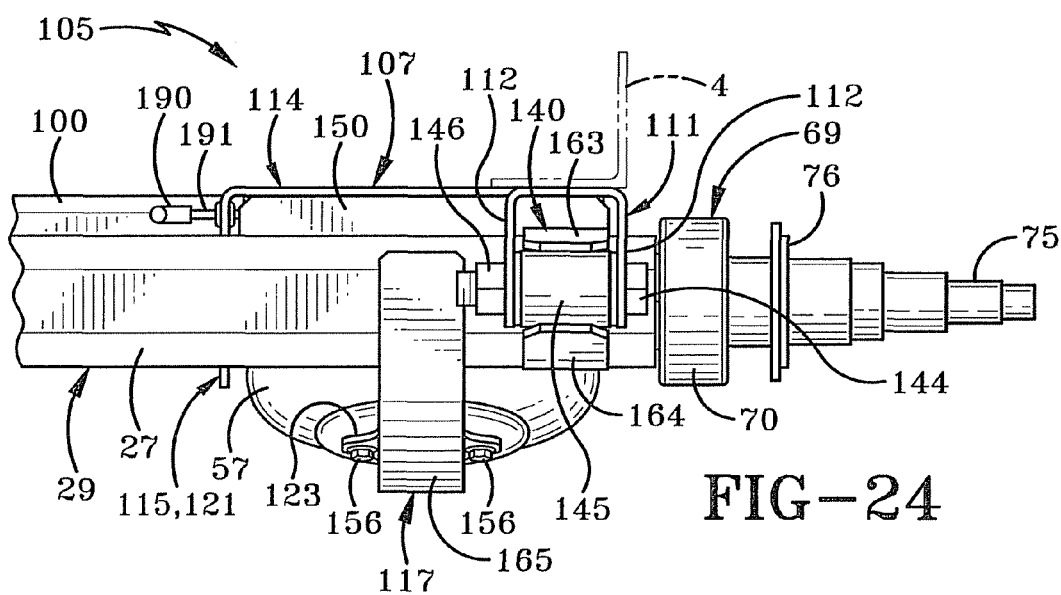
FIG. 24 is a front view of the second embodiment of the suspension assembly.

The air spring support arm 117 is rigidly mounted to the outer tube 27 of the torsion axle 29. A pivot assembly 140 is also rigidly attached to the outer tube 27 of the torsion axle 29. As shown in FIG. 23, when the suspension assembly 105 is assembled, the frame mounting bracket 107 is centered on a centerline C2 and the pivot assembly 140 is centered on a centerline C1. These two centerlines C1, 1C2 are spaced a distance L apart from each other so that the pivot assembly 140 and the support arm 117 are attached to the torsion axle 29 at different locations and they do not contact each other. As discussed later, the combination of the air spring support arm 117, the torsion axle 29 and the pivot assembly 140 rotates about a suspension system pivot axis 149 of the suspension assembly 105.

The frame mounting bracket 107 preferably has a flat top 114 that covers the air spring 57. The frame mounting bracket 107 has an exterior side 124 that has a side flange 122 that extends to at least partially cover one end of the cross-member brace 100. The frame mounting bracket 107 has an interior side 115 that has an elongated leg 121. The interior side 115 and the elongated leg 121 extend and at least partially wrap around an exterior portion of a cross-section of the cross-member brace 100. The flat top 114 of the frame mounting bracket 107 has a top flange 120 that partially overlaps the top of the cross-member brace 100. The cross-member brace 100 can be welded to the frame mounting bracket side flange 122, the elongated leg 121 and the top flange 120 or can be attached to these surfaces in other ways as appreciated by those of ordinary skill in the art. FIG. 28, discussed later, illustrates how the cross-member brace 100 can be attached to the frame mounting bracket 107 with a cross-member attachment device 99.

The frame mounting bracket 107 includes a flange portion 111 formed by a pair of spaced flange legs 112 at the end of the frame mounting bracket 107 opposite the cross-member brace 100 (FIGS. 20 and 21). The frame mounting bracket 107 may be formed with a central cutout 113 and preferably may include one or more reinforcing gussets.

As shown in FIGS. 21, 22A/B/C and 25, the pivot assembly 140 is formed with side walls 161, 162, a top member 163 and a bottom member 164. Side walls 161, 162 are positioned adjacent an annular cylindrical collar 145 and the outer tube 27 of the torsion axle 29. The top member 163 is located along upper edges of the side walls 161, 162. The bottom member 164 is located along bottom edges of the side walls 161, 162. The side walls 161, 162 can be rigidly attached to the annular collar 145 and the outer tube 27 of the torsion axle 29 by welding and the top member 163 and bottom member 164 can be welded to corresponding adjacent edges of the side walls 161, 162. The pivot assembly 140 is pivotally mounted between flange legs 112 by a pivot bolt 144 that extends through aligned holes 133 formed in the flange legs 112 and is secured by threadedly engaging a nut 146. The pivot bolt 144 and nut 146 may be spaced from flange legs 112 by washers. Preferably, a metal sleeve 148 is mounted on the bolt 144 and is located within a bore of a pair of bushings 142, 143 disposed within the base of the color 145. The bushing pair 142, 143 may form an elastomeric bushing. The bushings 142, 143 can form a bushing assembly similar to the bushing assembly shown in FIG. 9. The air suspension assembly 105 has a suspension assembly pivot axis 149 of bolt 144 which is spaced apart from and parallel with an axis 51 of the torsion axle 29 which is coaxial with an axis of the stub shaft 53 of the torsion axle 29.

The air spring 57 is secured at its lower end to the support arm 117 by a plurality of bolts 156 (FIG. 21) that may include washers 157. The air spring 57 is secured at its upper end to a mounting plate 150 and one or more bolts 154 and may include washers 155. The mounting plate 150 is in turn secured to the frame mounting bracket 107 by one or more bolts 152. The bolts 152 may be threaded directly into threads in the frame mounting bracket itself or into nuts 147 (FIG. 25) that are attached to the underside of the frame mounting bracket top 114. The air spring 57 is of a usual well-known construction having a flexible outer sleeve forming an internal air chamber as previously describe in system 1.

Figure 25:
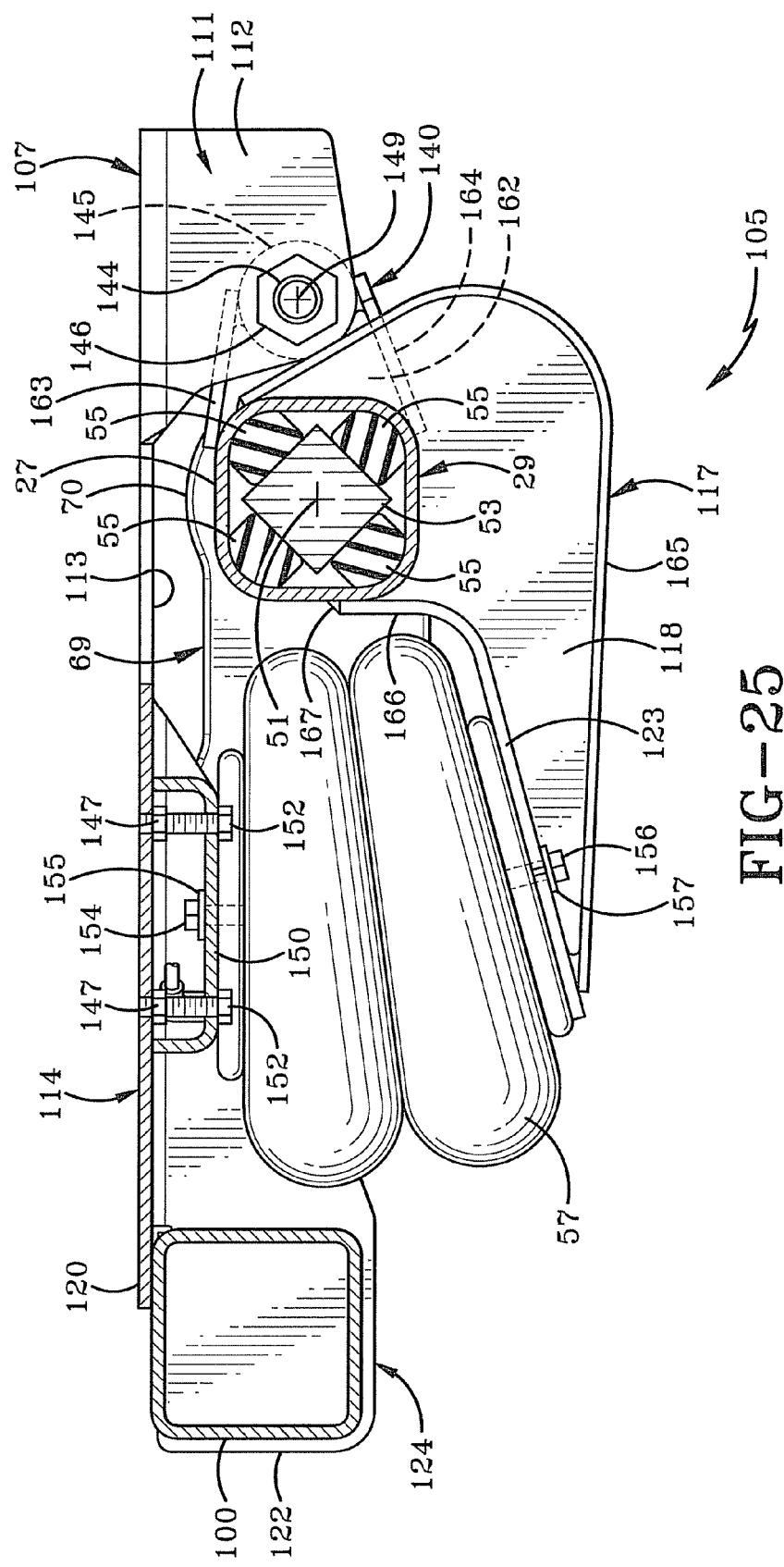
FIG. 25 is a cross-sectional view of the second embodiment of the suspension assembly.
Figure 26B:
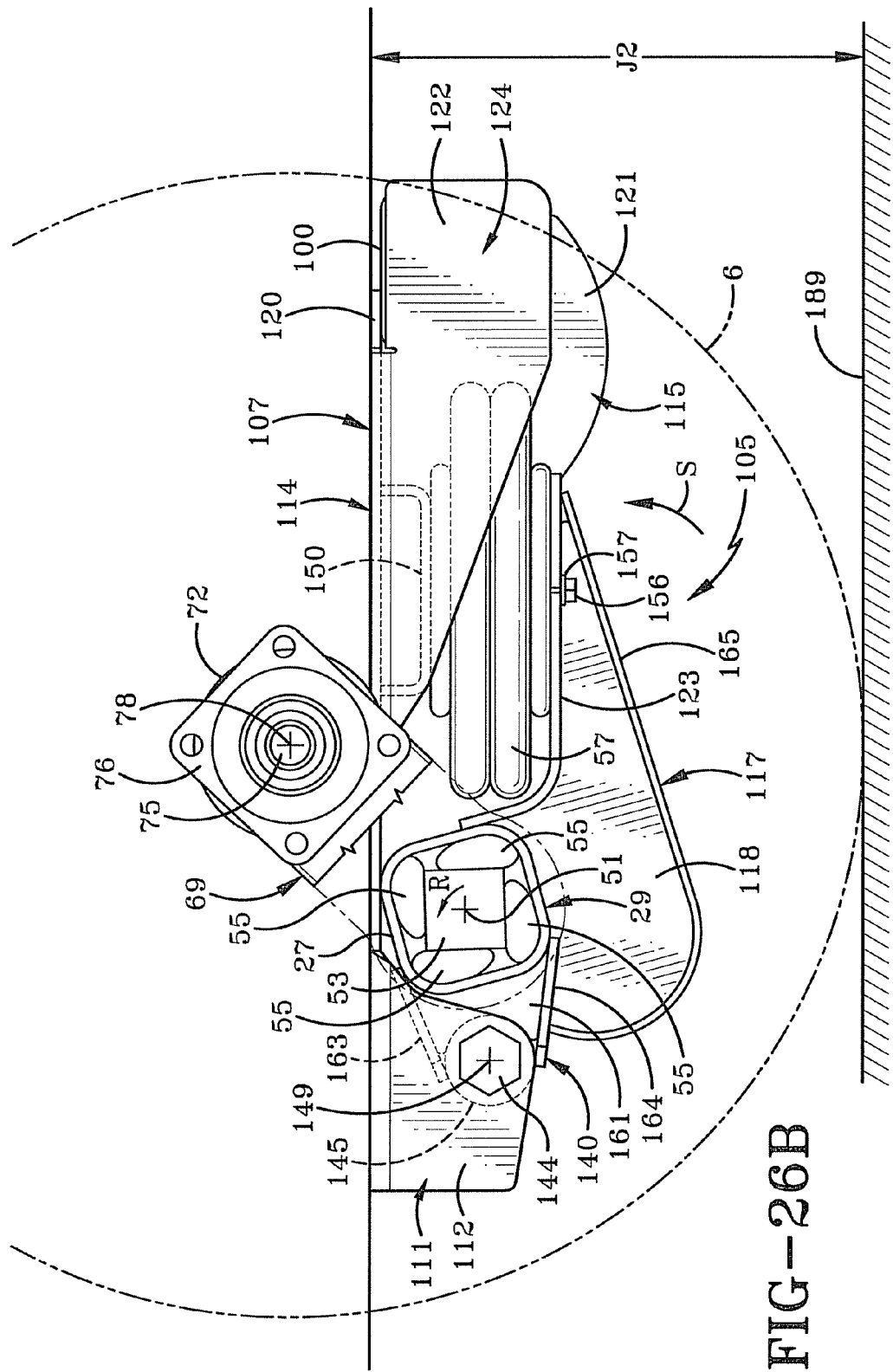
FIG. 26B is a cross-sectional view of the second embodiment of the suspension assembly in the jounce position in reaction to the upward force.

As shown in FIG. 25, the support arm 117 is further reinforced with at least a top reinforcing plate 123 and a bottom reinforcing plate 165. The bottom reinforcing plate 165 extends across the bottom edges of air spring arm members 118 and terminates and is secured to the outer tube 27 of the torsion axle 29 by welding. The top reinforcing plate 123 terminates in an upwardly curved end 166 which is secured to the outer tube 27 of the torsion axle 29 by welds 167 or other attachment means.

Figure 22B:
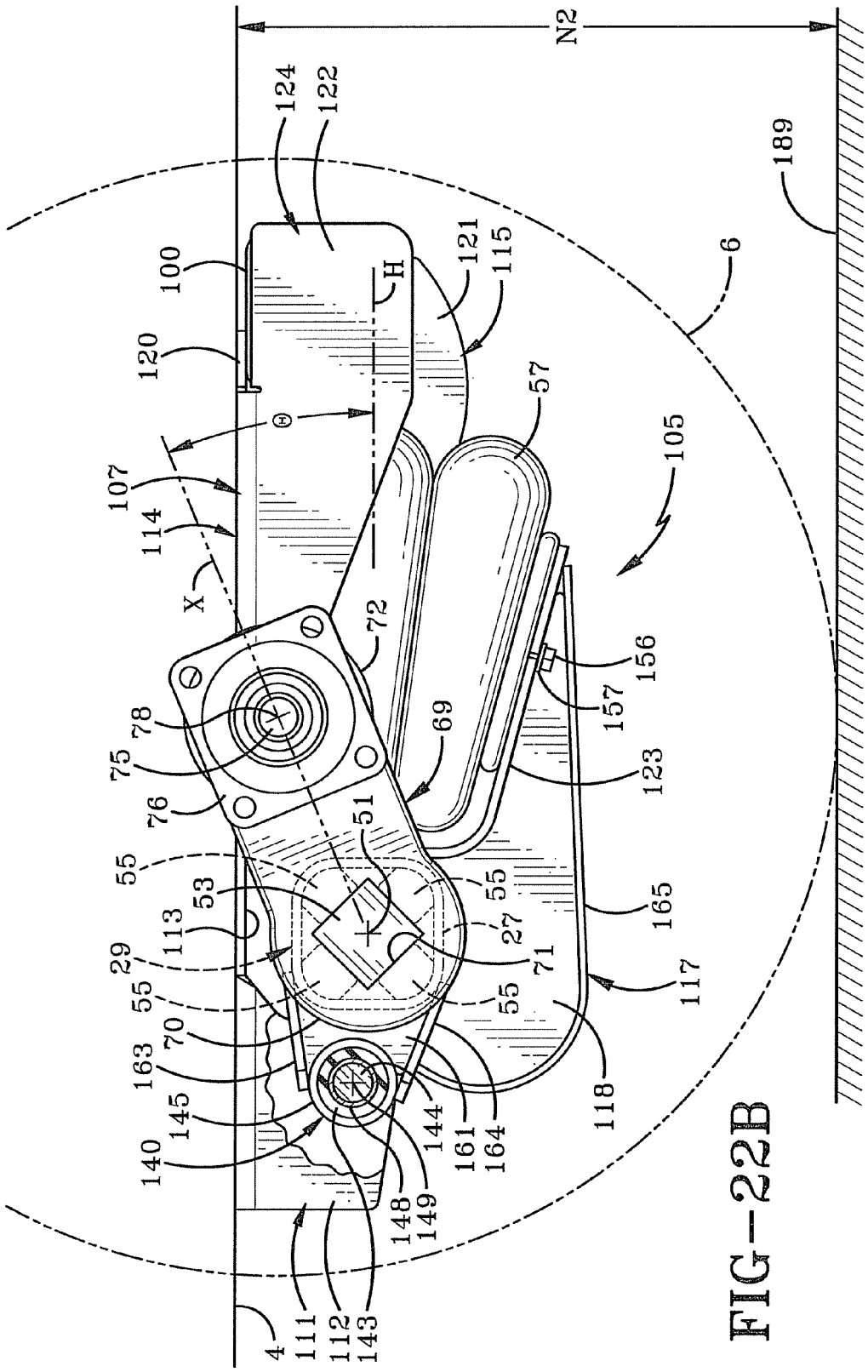
FIG. 22B is a view of the second embodiment of the suspension assembly in the design position under no loads and with the spindle arm at a 22.5 degree angle and with respect to horizontal.

Additionally, the spindle arm 69 can be set to be located at different angles when the suspension assembly 105 is in the design position and when the suspension assembly 105 is at equilibrium. The design position is the position the suspension assembly 105 is in when no other forces other than the weight of the trailer 2 are acting on the suspension assembly 105. As shown in FIG. 22B, a line X represents the line from the spindle axis 78 to the torsion axle axis 51. The angle θ between the horizontal line H and line X represents the angle of the spindle arm 69 in the design position. In FIG. 22B the spindle arm is at about a 22.5 degree angle. In FIG. 22A the spindle arm is at nearly at approximately a zero degree angle. Notice that when the spindle arm angle is at about 22.5 degrees, the bottom of the trailer 2 is a distance N2 to the ground 189 which is lower than the distance N1 of FIG. 22A. Alternatively, the spindle arm 69 can be set to a design position of 22.5, 10, −10, −22.5, or −45 degrees with respect to the horizontal line H when the suspension assembly 105 is at equilibrium. One way to set the angle θ of the spindle arm 69 is to form the square spindle opening 71 at the desired rotation to create the desired angle θ. Those of ordinary skill in the art will realize that the spindle opening 71 can be formed so that the spindle arm 69 can make other angles with respect to the horizontal line H other than those shown in the figures or listed here. Generally, the spindle arm angle θ cannot be changed after manufacturing of the suspension assembly 105.

Figure 22C:
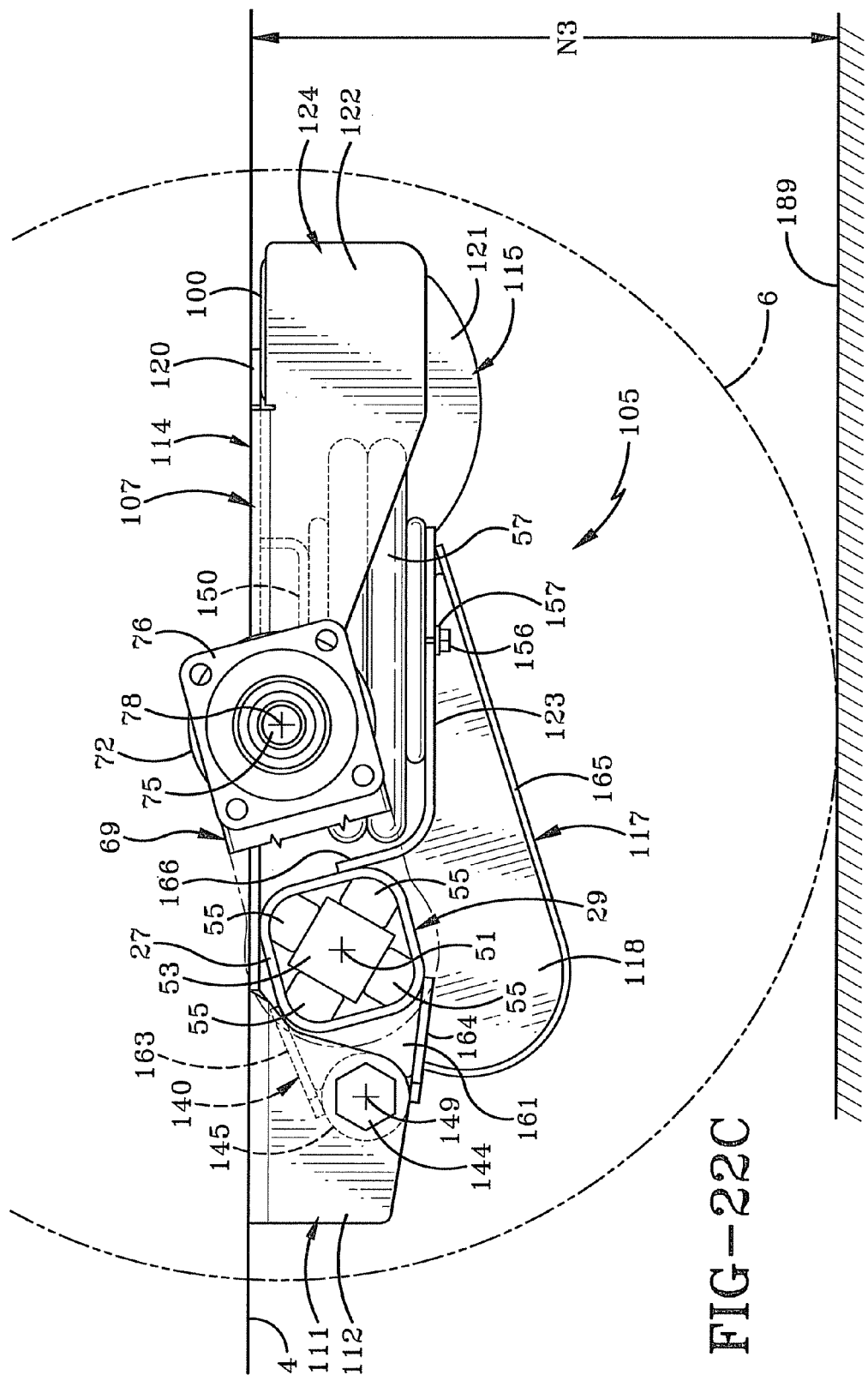
FIG. 22C is a view of the second embodiment of a suspension assembly in the design position under no loads and with no air in the air spring.

FIG. 22C shows the second embodiment of the suspension system 1 under no load condition without air in the air spring 57. This suspension assembly 105 may be operated without air (or with reduced air) in the air springs to lower the trailer 2 to match the height of a loading dock or to pass under an overhead obstacle. The distance from the bottom of the trailer 2 to the ground 189 with no air in the air spring 57 is N3 which is less than the distances N1 and N2 of FIGS. 22A and 22B when there is air in the air spring 57 in the design position.

The manner of operation of the second embodiment of the suspension assembly 105 is best shown in FIGS. 22-27. FIGS. 22A and 25 show the suspension assembly 105 in the design position when there is no load acting on the suspension assembly 105. FIG. 26A shows the position of the air spring 57 and the support arm 117 in the design position at the start of a jounce movement whereas only a rotational force indicated by Arrow R, is applied to the stub shaft 53 that is initially absorbed by the elastomeric members 55 without the air spring 57 experiencing any substantial movement. In FIG. 26B, the rotational force indicated by Arrow R is now transferred to the air spring 57 so that air spring 57 is compressed into the full jounce position of FIG. 26B. FIG. 26B shows both the torsion axle 29, and in particular stub shaft 53 and the air spring 57, in a full jounce position as shown by the counterclockwise pivotal movement of air spring support arm 117 in the direction of Arrow S and the rotational movement of stub shaft 53 in the direction of Arrow R. The trailer 2 is a closer distance J2 to the ground 189 in a nearly full jounce position than when the air bag 57 is inflated and the trailer 2 is at a distance J1 (FIG. 22A) from the ground 189 at the design position at the start of jounce movement.

FIG. 27A shows the start of the rebound of the suspension assembly 105 that may result when the wheel 6 drops into a hole in a surface 189 it is traveling over. Rebound can also be a recovery, that is, the return of energy stored in the suspension system 1 of both the air spring 57 and rubber springs or elastomeric members 55 in the torsion axle 29. In general, a downward force on the wheel 6 will turn the spindle arm 69 in the direction of Arrow T. Next, this force is passed through the air spring support arm 117 to the air spring 57. This force pushes the support arm 117 in the direction of Arrow U (FIG. 27B) which in turn pushes the air spring 57 beyond the design position and can extend the air spring 57 to its limit as shown in FIG. 27B. FIG. 27B shows the full rebound position where the stub shaft 53 and its associated elastomeric members 55 and the air spring 57 provide the desired stability to the suspension assembly 105 by absorbing the various twisting and up and down or side to side movements exerted on the trailer wheels 6. In FIG. 27A, the trailer 2 is a distance R1 to the ground 189 in the design position. This is closer than a distance R2 to the ground 189 when the air spring 57 nearly fully inflated or extended as shown in FIG. 27B. The independent side-to-side absorption or compliance of the rubber torsion system provides roll control for stability and diagonal compliance to allow the suspension assembly 105 to function on uneven terrain. This allows the suspension assembly 105 to travel over one wheel bumps or encounter diagonal bumps.

Similar to the suspension assembly 5 of the first embodiment, the suspension assembly 105 of the second embodiment provides for considerable advantages over the suspension system of U.S. Pat. No. 6,340,165. For example, both embodiments considerably reduce the length of the air spring support arm 117 and move the air spring 57 closer inboard or forward to the pivot axis 51 of the torsion axle 29 and the suspension assembly pivot axis 149. In accordance with one of the main features of suspension assembly 105 of the second embodiment shown particularly in FIGS. 22A/B/C, 25, 26A/B and 27A/B, the air spring 57 is spaced a considerable distance inboard or forward toward the suspension assembly pivot axis 149 than the suspension assembly of U.S. Pat. No. 6,340,165. This allows for a considerably shorter air spring support arm 117 than the support arm of the prior art suspension assembly.

FIG. 28 shows a third embodiment of a suspension assembly 105 with a cross-member attachment device 99 attached to the frame mounting bracket 107. The cross-member attachment device 99 may be a cylindrical cross-member attachment device 101 as shown in FIG. 28. The cylindrical cross-member attachment device 101 may be welded to the frame mounting bracket 107 or attached to the frame mounting bracket 107 by another means as understood by those of ordinary skill in the art. The cylindrical cross-member attachment device 101 is adapted to receive a cylindrical cross-member brace 104 allow for easy installation of the suspension assembly 105 to a trailer 2. For example, the cross-member attachment device 99 and more specifically the tubular cylindrical attachment device 104 may have an opening 90 into an interior chamber. The cross-member attachment device 99 is adapted to have an end portion of the cross-member brace 100 slid through the opening 90 into the chamber. The cross-member attachment device 99 further includes a cylindrical inner surface 102 defining the chamber. The cross-member brace 100 has a cylindrical outer surface 103.

The vehicle suspension assembly 105 is positioned with the inner surface 102 inside the chamber adjacent the outer surface 103 of the cross-member brace 100 when the cross-member brace 100 is attached to the frame mounting bracket 107. The cross-member brace 100 is positioned rearward of the spindle axis 75, which is rearward the torsion axle axis 51, which is rearward the suspension assembly pivot axis 149.

As discussed earlier, when installed, the cross-member brace 100 provides a load path for loads to be propagated from one side of the trailer 2 to the other side of the trailer 2. For example, when an upward force is encountered primarily by the right side suspension assembly of the trailer 2, it can then be propagated by the cross-member brace 100 to the left side suspension assembly where it can be projected as a downward force. This can accelerate bringing the suspension system 1 to equilibrium and improve the operating characteristics of the suspension assembly 105.

Of course, those of ordinary skill in the art will appreciate that the cylindrical cross-member brace 101 and the generally square shaped cross-member brace 100 can be other shapes and have different cross-sections suitable for providing rigidity to the second embodiment of the suspension assembly 105.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A vehicle suspension assembly comprising:
 a frame mounting bracket adapted to mount on a frame of a vehicle;
 a torsion axle pivotally attached to the frame mounting bracket, wherein the torsion axle pivots about a suspension assembly pivot axis, and wherein a torsion axle axis is spaced from the suspension assembly pivot axis;
 an air spring support arm rigidly attached to the torsion axle;
 an air spring having at least one convolute, wherein a first end of the air spring is attached at one end to the frame mounting bracket, and wherein a second end of the air spring is attached at an end of the support arm that is opposite the suspension assembly pivot axis;
 a spindle arm attached to the torsion axle and having a distal end extending in a direction rearward adjacent the air spring;
 a spindle mounted on and extending outwardly from the distal end of the spindle arm and having a spindle axis, wherein the spindle is adapted for mounting a wheel assembly to the spindle; and
 a cross-member attachment device attached to the frame mounting bracket, wherein the cross-member attachment device is adapted to receive a cross-member brace extending across a width of a vehicle to an adjacent vehicle suspension assembly, wherein the suspension assembly and the cross-member brace are configured to be attached to the frame of the vehicle by only attaching the frame mounting bracket to the frame of the vehicle and wherein the cross-member device does not contact the frame of the vehicle.

2. The vehicle suspension assembly of claim 1 wherein the cross-member attachment device is attached to an end of the frame mounting bracket opposite the suspension assembly pivot axis.

3. The vehicle suspension assembly of claim 1 wherein the suspension assembly further comprises:
a pivot assembly which pivotally attaches the torsion axle to the frame mounting bracket.

4. The suspension assembly of claim 3, further comprising:
a pivot assembly centerline, where the pivot assembly is centered at the pivot assembly centerline;
a support arm centerline, wherein the air spring support arm is centered at the support arm centerline; and
wherein the pivot assembly centerline and the support arm centerline are parallel and spaced apart.

5. The suspension assembly of claim 3 wherein the pivot assembly further comprises:
a cylindrical member, and wherein the suspension assembly pivot axis passes through the cylindrical member.

6. The suspension assembly of claim 1 wherein the spindle arm makes an angle with respect to horizontal that is one of the group of −22.5 degrees, −10 degrees, 0 degrees, 10 degrees, 22.5 degrees, and 45 degrees.

7. The vehicle suspension assembly of claim 1 wherein the torsion axle further comprises:
an outer tube;
a stub axle located partially inside the outer tube and extending out of the outer tube; and
a plurality of elastic members between the outer tube and the stub axle.

8. The vehicle suspension assembly of claim 1 further comprising:
an interior chamber formed in the cross-member attachment device having an entrance opening, wherein the cross-member attachment device is adapted to slidably receive a portion of the cross-member brace through the entrance opening.

9. The vehicle suspension assembly of claim 1 wherein the cross-member attachment device is a hollow cylinder adapted to receive a cross-member brace that is cylindrical in shape.

10. The vehicle suspension assembly of claim 1 wherein the cross-member brace is hollow.

11. The vehicle suspension assembly defined in claim 1 wherein the torsion axle axis is spaced within a general range of three to six inches from the suspension assembly pivot axis.

12. A vehicle
suspension assembly comprising:
a frame mounting bracket adapted to mount on a frame of a vehicle;
a torsion axle pivotally attached to the frame mounting bracket, wherein the torsion axle pivots about a suspension assembly pivot axis, and wherein a torsion axle axis is spaced from the suspension assembly pivot axis;
an air spring support arm rigidly attached to the torsion axle;
an air spring having at least one convolute, wherein a first end of the air spring is attached at one end to the frame mounting bracket, and wherein a second end of the air spring is attached at an end of the support arm that is opposite the suspension assembly pivot axis;
a spindle arm attached to the torsion axle and having a distal end extending in a direction rearward adjacent the air spring;
a spindle mounted on and extending outwardly from the distal end of the spindle arm and having a spindle axis, wherein the spindle is adapted for mounting a wheel assembly to the spindle; and
a cross-member attachment device attached to the frame mounting bracket, wherein the cross-member attachment device is adapted to receive a cross-member brace extending across a width of a vehicle to an adjacent vehicle suspension assembly,
wherein the vehicle suspension assembly is within a diameter of the wheel.

13. A suspension assembly comprising:
a frame mounting bracket adapted to mount on a frame of a vehicle;
a torsion axle pivotally attached to the frame mounting bracket, wherein the torsion axle pivots about a suspension assembly pivot axis, and wherein a torsion axle axis is spaced from the suspension assembly pivot axis;
an air spring support arm rigidly attached to the torsion axle;
an air spring having at least one convolute, wherein a first end of the air spring is attached at one end to the frame mounting bracket, and wherein a second end of the air spring is attached at an end of the support arm that is opposite the suspension assembly pivot axis;
a spindle arm attached to the torsion axle and having a distal end extending in a direction rearward adjacent the air spring;
a spindle mounted on and extending outwardly from the distal end of the spindle arm and having a spindle axis, wherein the spindle is adapted for mounting a wheel assembly to the spindle; and
a cross-member attachment device attached to the frame mounting bracket, wherein the cross-member attachment device is adapted to receive a cross-member brace extending across a width of a vehicle to an adjacent vehicle suspension assembly, wherein the pivot assembly is attached to a first location on the torsion axle; the support arm is attached to a second location on the torsion axle; the pivot assembly is not in contact with the support arm; and the frame mounting bracket is not in contact with the support arm.

14. A vehicle suspension assembly comprising:
a frame mounting bracket adapted to mount on a frame of a vehicle;
a torsion axle pivotally attached to the frame mounting bracket, wherein the torsion axle pivots about a suspension assembly pivot axis, and wherein a torsion axle axis is spaced from the suspension assembly pivot axis;
an air spring support arm rigidly attached to the torsion axle;
an air spring having at least one convolute, wherein a first end of the air spring is attached at one end to the frame mounting bracket, and wherein a second end of the air spring is attached at an end of the support arm that is opposite the suspension assembly pivot axis;
a spindle arm attached to the torsion axle and having a distal end extending in a direction rearward adjacent the air spring;
a spindle mounted on and extending outwardly from the distal end of the spindle arm and having a spindle axis, wherein the spindle is adapted for mounting a wheel assembly to the spindle; and a cross-member attachment device attached to the frame mounting bracket, wherein the cross-member attachment device is adapted to receive a cross-member brace extending across a width of a vehicle to an adjacent vehicle suspension assembly, wherein the cross-member attachment device is rearward the spindle axis, the spindle axis is rearward the torsion axle axis, and the torsion axle axis is rearward the suspension assembly pivot axis.

15. A vehicle suspension assembly comprising:
a frame mounting bracket adapted to mount on a frame of a vehicle;
a torsion axle pivotally attached to the frame mounting bracket, wherein the torsion axle pivots about a suspension assembly pivot axis, and wherein a torsion axle axis is spaced from the suspension assembly pivot axis;
an air spring support arm rigidly attached to the torsion axle;
an air spring having at least one convolute, wherein a first end of the air spring is attached at one end to the frame mounting bracket, and wherein a second end of the air spring is attached at an end of the support arm that is opposite the suspension assembly pivot axis;
a spindle arm attached to the torsion axle and having a distal end extending in a direction rearward adjacent the air spring;
a spindle mounted on and extending outwardly from the distal end of the spindle arm and having a spindle axis, wherein the spindle is adapted for mounting a wheel assembly to the spindle; and
a cross-member attachment device attached to the frame mounting bracket, wherein the cross-member attachment device is adapted to receive a cross-member brace extending across a width of a vehicle to an adjacent vehicle suspension assembly, wherein at least part of the air spring is higher than a bottom of the cross-member attachment device.

16. A vehicle suspension assembly comprising:
a frame mounting bracket adapted to mount on a frame of a vehicle;
a torsion axle pivotally attached to the frame mounting bracket, wherein the torsion axle pivots about a suspension assembly pivot axis, and wherein a torsion axle axis is spaced from the suspension assembly pivot axis;
an air spring support arm rigidly attached to the torsion axle;
an air spring having at least one convolute, wherein a first end of the air spring is attached at one end to the frame mounting bracket, and wherein a second end of the air spring is attached at an end of the support arm that is opposite the suspension assembly pivot axis;
a spindle arm attached to the torsion axle and having a distal end extending in a direction rearward adjacent the air spring;
a spindle mounted on and extending outwardly from the distal end of the spindle arm and having a spindle axis, wherein the spindle is adapted for mounting a wheel assembly to the spindle; and
a cross-member attachment device attached to the frame mounting bracket, wherein the cross-member attachment device is adapted to receive a cross-member brace extending across a width of a vehicle to an adjacent vehicle suspension assembly, wherein the frame mounting bracket further includes:
a flat top that covers the air spring, wherein the flat top includes a top flange extending at least partially over the cross-member brace;
an exterior side including a side flange adapted to extend at least partially over one end of the cross-member brace; and
an interior side including an elongated leg adapted to at least partially wrap around an exterior portion of a cross-section of the cross-member brace.

17. The vehicle suspension assembly of claim 16 wherein the side flange, the elongated leg and the top flange are adapted to be welded to the cross-member brace.

18. The vehicle suspension assembly of claim 16 wherein the flat top, exterior side and interior side are formed with a same piece of metal, and wherein the exterior side and interior side are opposite parallel sides.

19. A vehicle suspension assembly comprising:
a frame mounting bracket adapted to mount on a frame of a vehicle;
a torsion axle pivotally attached to the frame mounting bracket, wherein the torsion axle pivots about a suspension assembly pivot axis, and wherein a torsion axle axis is spaced from the suspension assembly pivot axis;
an air spring support arm rigidly attached to the torsion axle;
an air spring having at least one convolute, wherein a first end of the air spring is attached at one end to the frame mounting bracket, and wherein a second end of the air spring is attached at an end of the support arm that is opposite the suspension assembly pivot axis;
a spindle arm attached to the torsion axle and having a distal end extending in a direction rearward adjacent the air spring;
a spindle mounted on and extending outwardly from the distal end of the spindle arm and having a spindle axis, wherein the spindle is adapted for mounting a wheel assembly to the spindle;
a cross-member attachment device attached to the frame mounting bracket, wherein the cross-member attachment device is adapted to receive a cross-member brace extending across a width of a vehicle to an adjacent vehicle suspension assembly; and
an air spring mounting bracket with a top and a bottom adapted to be removably attached to the frame mounting bracket, wherein the air spring is attached at one end to the frame mounting bracket by attaching a top end of the air spring to the bottom of the air spring mounting bracket and attaching the top of the air spring mounting bracket to the frame mounting bracket.

20. The suspension assembly of claim 19 wherein the air spring mounting bracket is removably attached to the frame mounting bracket with bolts.

21. A vehicle suspension assembly comprising:
a frame mounting bracket with a first end and a second end adapted to be attached the to a vehicle frame;
a torsion axle with a longitudinal length;
a pivot assembly attached to the torsion axle so that it rotates with the torsion axle, wherein the pivot assembly is pivotally attached to the first end of the frame mounting bracket;
an air spring support arm with a first end and a second end, wherein the first end of the support arm is rigidly attached to the torsion axle;
an air spring attached to the second end of the frame mounting bracket and the second end of the air spring support arm, and wherein the pivot assembly and the air spring support arm are not in contact with each other, wherein the frame mounting bracket and the air spring support arm are not in contact with each other, wherein the pivot assembly and air spring support arm are not attached to the same longitudinal portion of the torsion axle with a gap on the torsion axle between where the air spring support arm is attached to the torsion axle and where the pivot assembly is attached to the torsion axle, and wherein the portion of the torsion axle between the pivot assembly and the air spring support arm separates the pivot assembly from the air spring support arm.

* * * * *